(12) United States Patent
Yamakawa

(10) Patent No.: US 11,049,257 B2
(45) Date of Patent: Jun. 29, 2021

(54) DATA STRUCTURE, INFORMATION PROCESSING APPARATUS, AND CONTROL METHOD THEREOF

(71) Applicant: CANON KABUSHIKI KAISHA, Tokyo (JP)

(72) Inventor: Kanako Yamakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 16/089,654

(22) PCT Filed: Mar. 31, 2017

(86) PCT No.: PCT/JP2017/013502
§ 371 (c)(1),
(2) Date: Sep. 28, 2018

(87) PCT Pub. No.: WO2017/170978
PCT Pub. Date: Oct. 5, 2017

(65) Prior Publication Data
US 2019/0114782 A1 Apr. 18, 2019

(30) Foreign Application Priority Data

Apr. 1, 2016 (JP) .............................. JP2016-074600

(51) Int. Cl.
*G06K 9/00* (2006.01)
*G06T 7/20* (2017.01)
(Continued)

(52) U.S. Cl.
CPC ............ *G06T 7/20* (2013.01); *G06K 9/00765* (2013.01); *G06T 7/11* (2017.01); *G06T 11/60* (2013.01);
(Continued)

(58) Field of Classification Search
CPC ................ G06K 9/00765; G06T 11/60; G06T 2207/10016; G06T 7/11; G06T 7/20;
(Continued)

(56) References Cited

U.S. PATENT DOCUMENTS 8,411,735 B2 * 4/2013 Ono ........................ G11B 27/34
375/240.01
2009/0074235 A1 * 3/2009 Lahr ...................... G06F 3/0482
382/100
(Continued)

FOREIGN PATENT DOCUMENTS

EP    1 187 476 A1    3/2002
EP    1 624 457 A1    2/2006
(Continued)

OTHER PUBLICATIONS

The US and EP publications were cited the International Search Report of International Application No. PCT/JP2017/013502 dated Jun. 30, 2017, a copy of which is enclosed.
(Continued)

*Primary Examiner* — Xin Jia
(74) *Attorney, Agent, or Firm* — Cowan, Liebowitz & Latman, P.C.

(57) ABSTRACT

Provided is a data structure that makes it possible to easily understand a relationship between pre- and post-editing moving image data on a frame-by-frame basis. A data file has an area for moving image data, and an area, different from the area for the moving image data, for associated information related to the moving image data. The associated information includes identification information for identifying a data file for moving image data related to the moving image data, and information specifying a segment of frames of the moving image data.

18 Claims, 18 Drawing Sheets

(51) Int. Cl.
  *H04N 5/907* (2006.01)
  *H04N 5/77* (2006.01)
  *G11B 27/30* (2006.01)
  *G11B 27/031* (2006.01)
  *G06T 7/11* (2017.01)
  *G06T 11/60* (2006.01)

(52) U.S. Cl.
  CPC .......... *G11B 27/031* (2013.01); *G11B 27/309* (2013.01); *H04N 5/772* (2013.01); *H04N 5/907* (2013.01); *G06T 2207/10016* (2013.01)

(58) Field of Classification Search
  CPC .... G11B 27/031; G11B 27/309; H04N 5/772; H04N 5/907
  See application file for complete search history.

(56) References Cited

U.S. PATENT DOCUMENTS

| | | | | |
|---|---|---|---|---|
| 2011/0206348 | A1* | 8/2011 | Numakami | H04N 5/765 386/248 |
| 2013/0142258 | A1* | 6/2013 | Tsuihiji | G11B 27/322 375/240.12 |
| 2014/0133835 | A1 | 5/2014 | Sekiguchi | |
| 2014/0169753 | A1* | 6/2014 | Murakami | H04N 5/772 386/224 |
| 2014/0341546 | A1* | 11/2014 | Hamada | G11B 27/034 386/282 |
| 2015/0012823 | A1 | 1/2015 | Egusa | |
| 2015/0036997 | A1* | 2/2015 | Omori | H04N 5/772 386/226 |

FOREIGN PATENT DOCUMENTS

| | | |
|---|---|---|
| JP | 2004-355794 A | 12/2004 |
| JP | 2006-157343 A | 6/2006 |
| JP | 2014-096759 A | 5/2014 |

OTHER PUBLICATIONS

The above foreign patent documents were cited in the Aug. 30, 2019 Japanese Office Action, a copy of which is enclosed without an English Translation, that issued in Japanese Patent Application No. 2016074600.

* cited by examiner

[Fig. 1A]
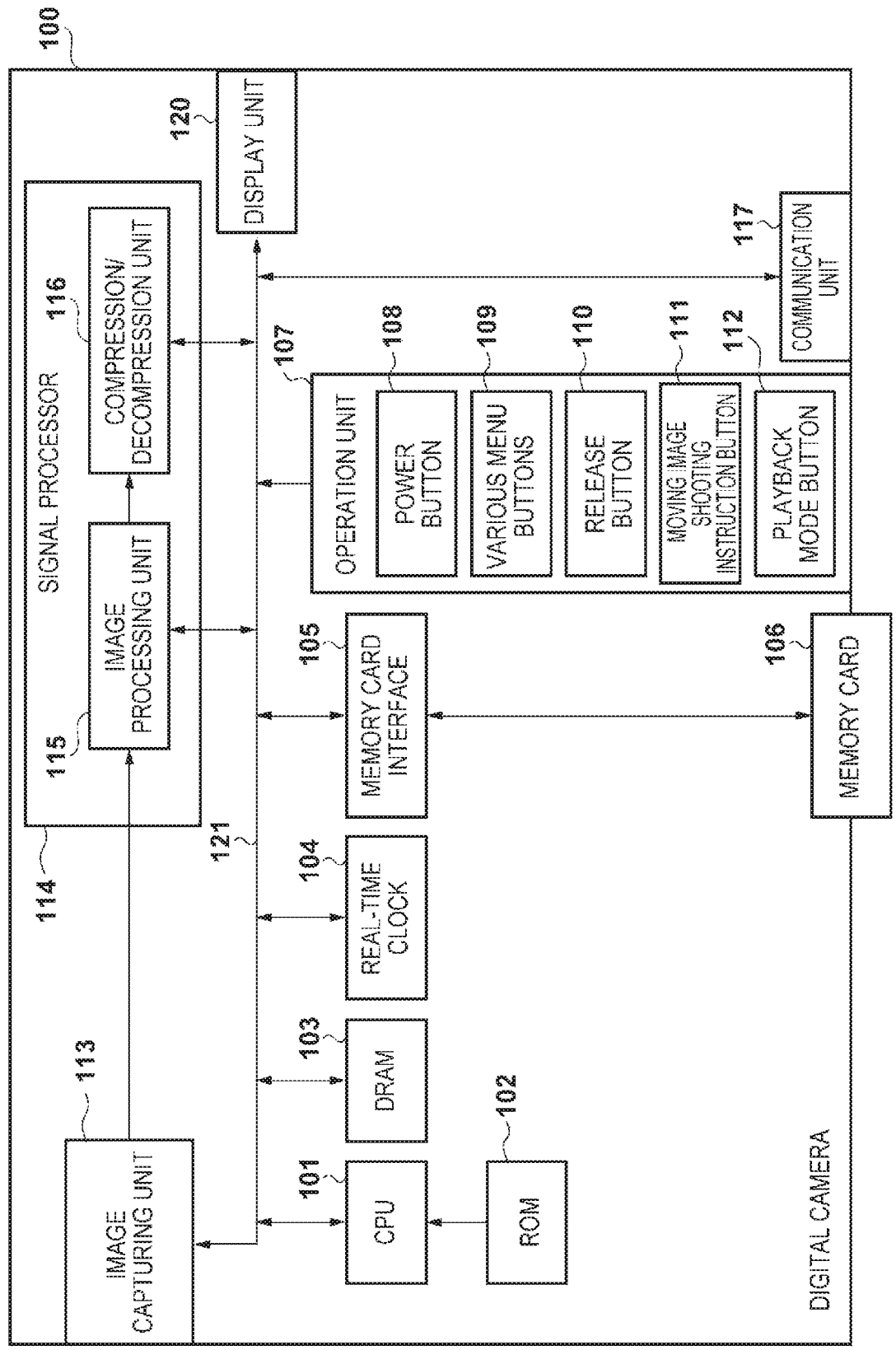

[Fig. 1B]
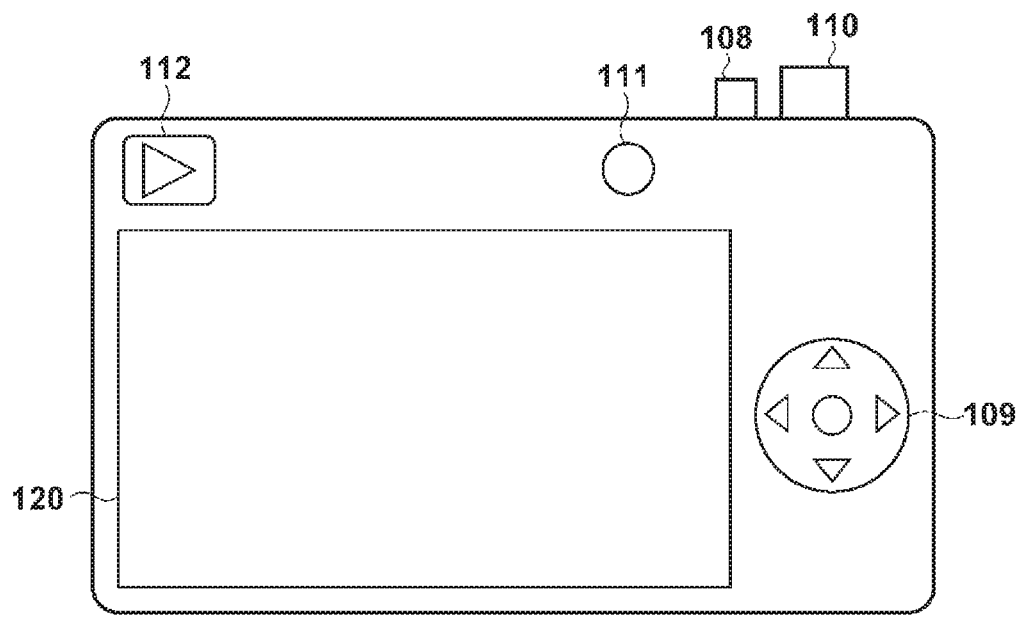
[Fig. 2]
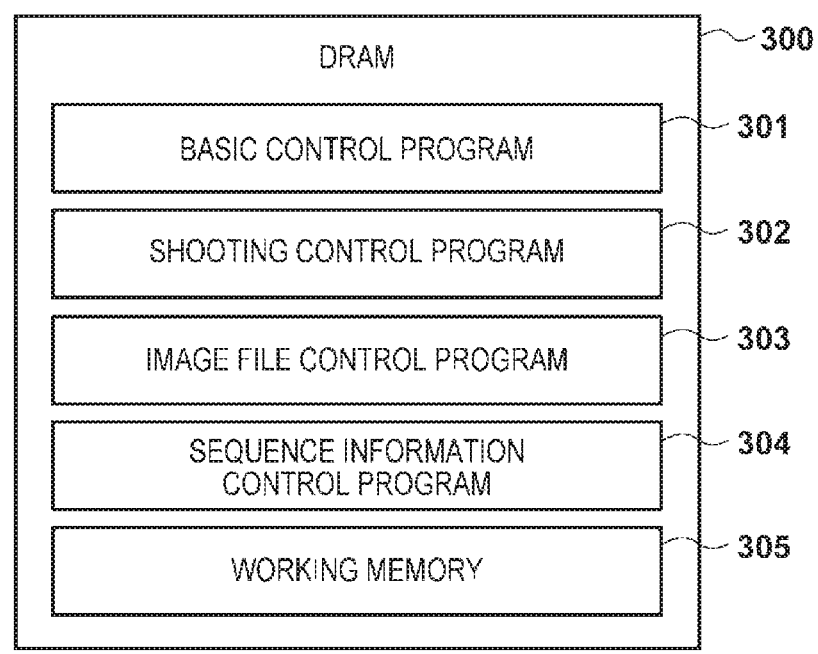

[Fig. 3A]
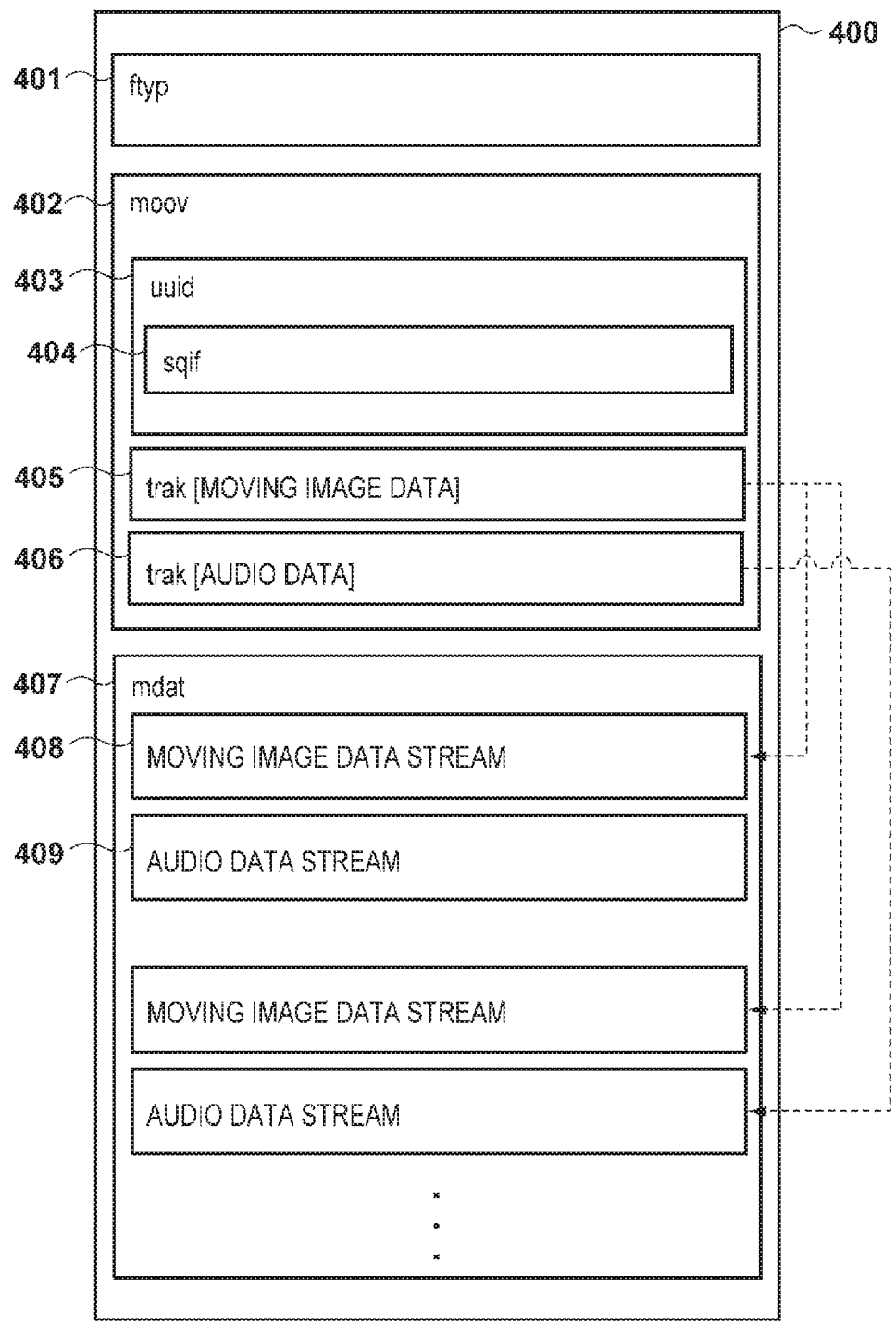

[Fig. 3B]

| | 501 Shooting ID | 502 Start Frame Index | 503 End Frame Index | 504 Total Frame Num | 505 Past Processing Status |
|---|---|---|---|---|---|
| 500 | 0000000000000000 | 1 | 100 | 100 | 0x00000000 |
| 510 | 1111111111111111 | 1 | 100 | 200 | 0x00000001 |
| 520 | 1111111111111111 | 101 | 200 | 200 | 0x00000001 |

[Fig. 4A]
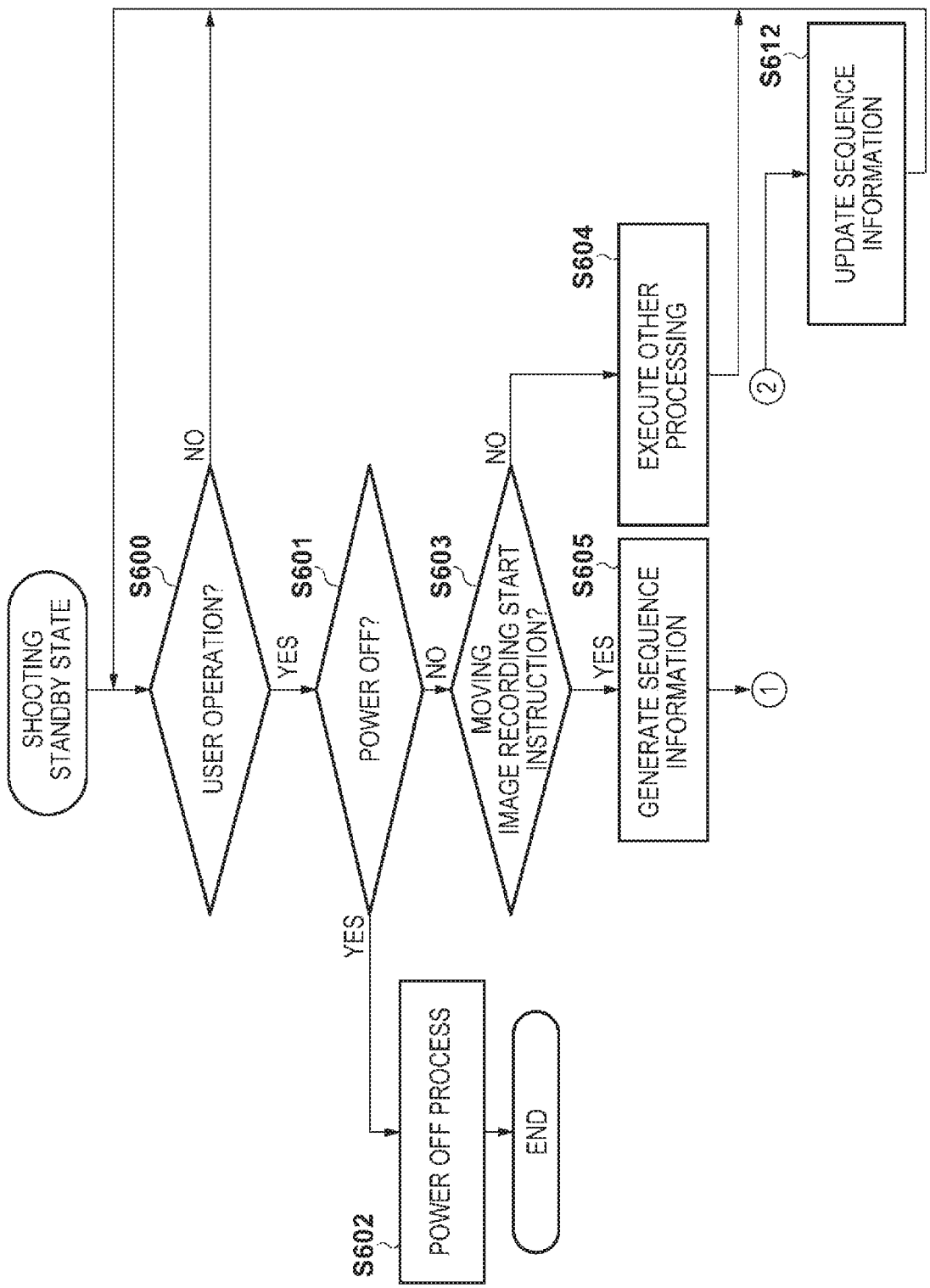

[Fig. 4B]
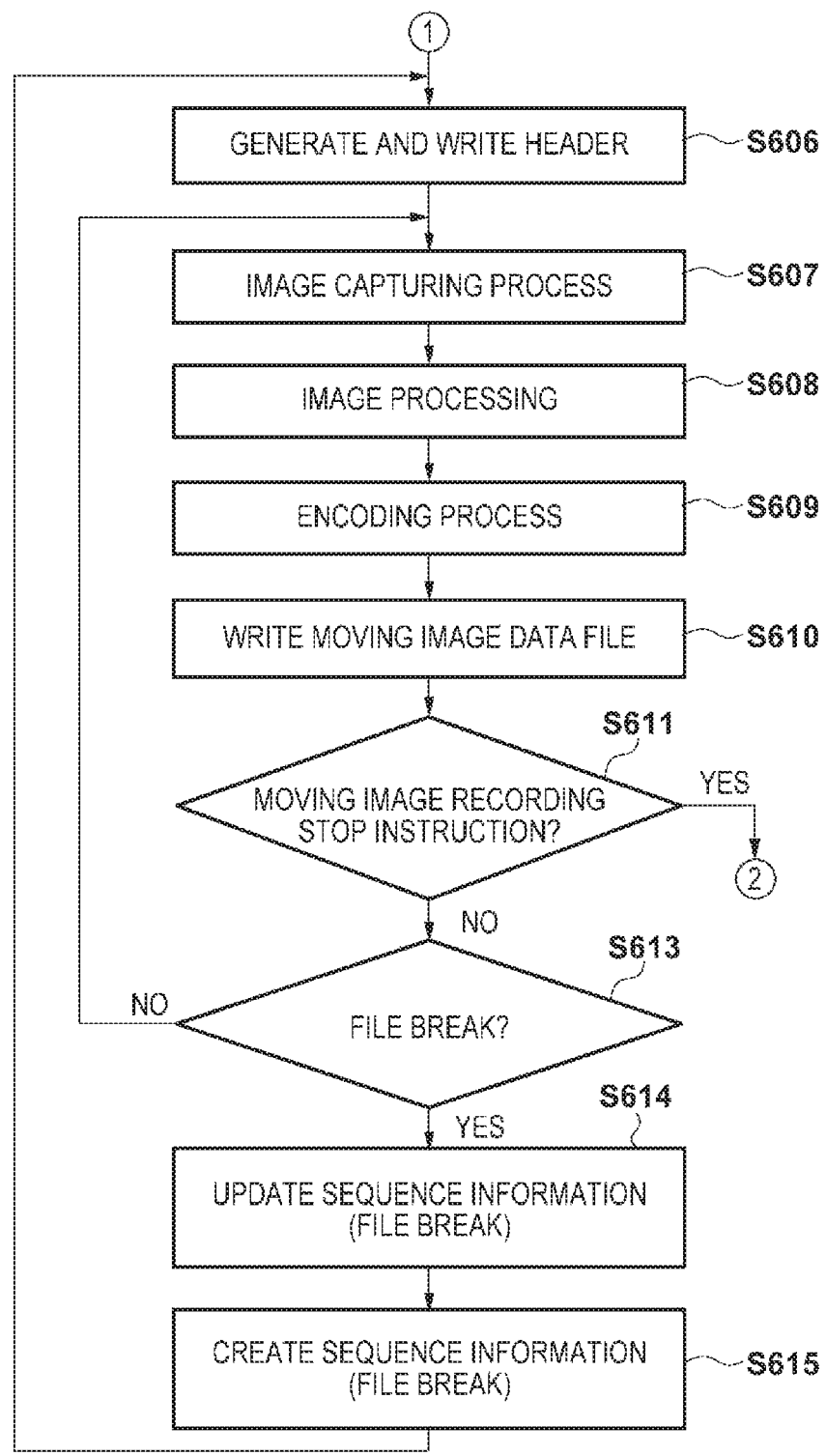

[Fig. 5]
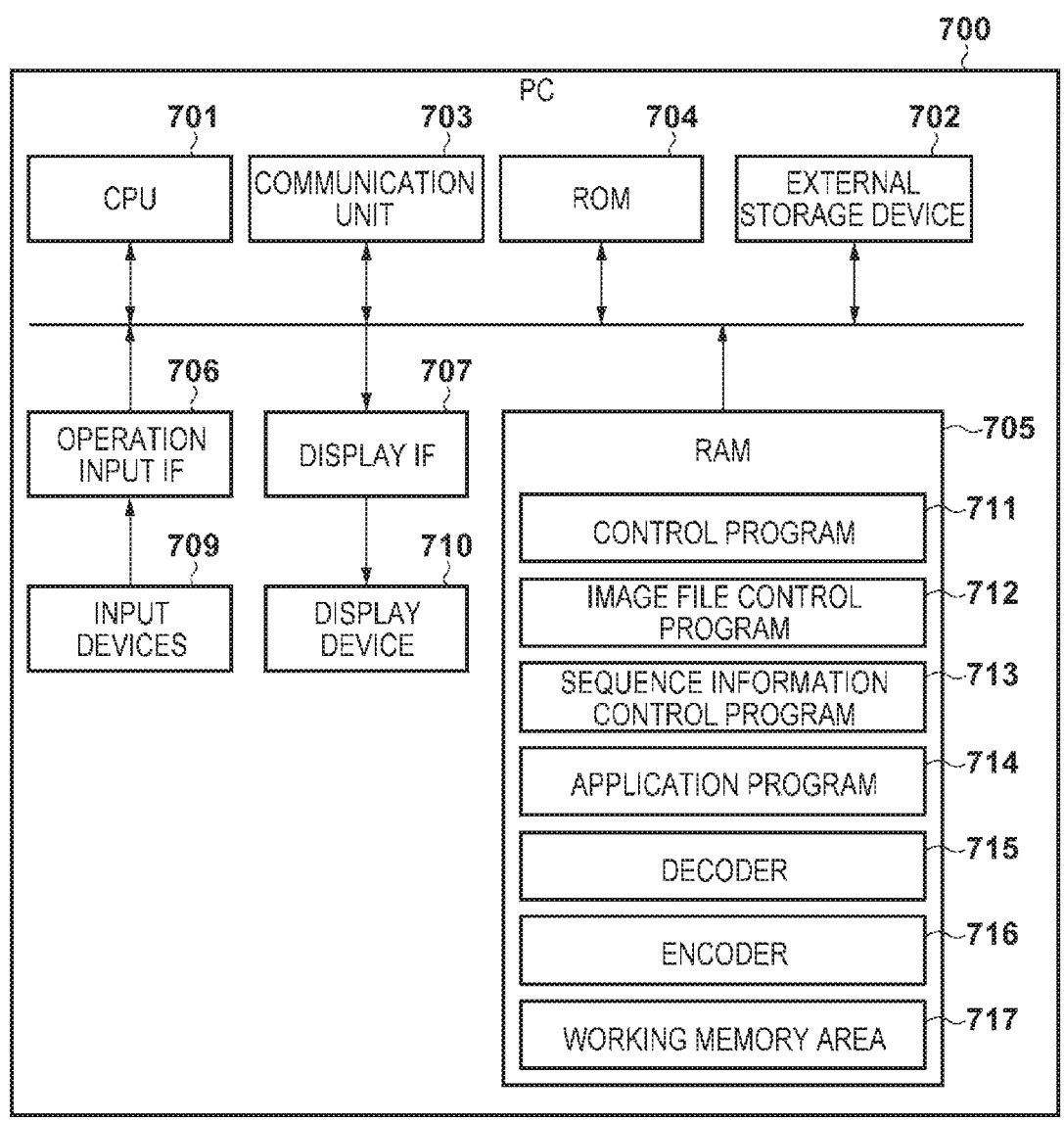

[Fig. 6A]
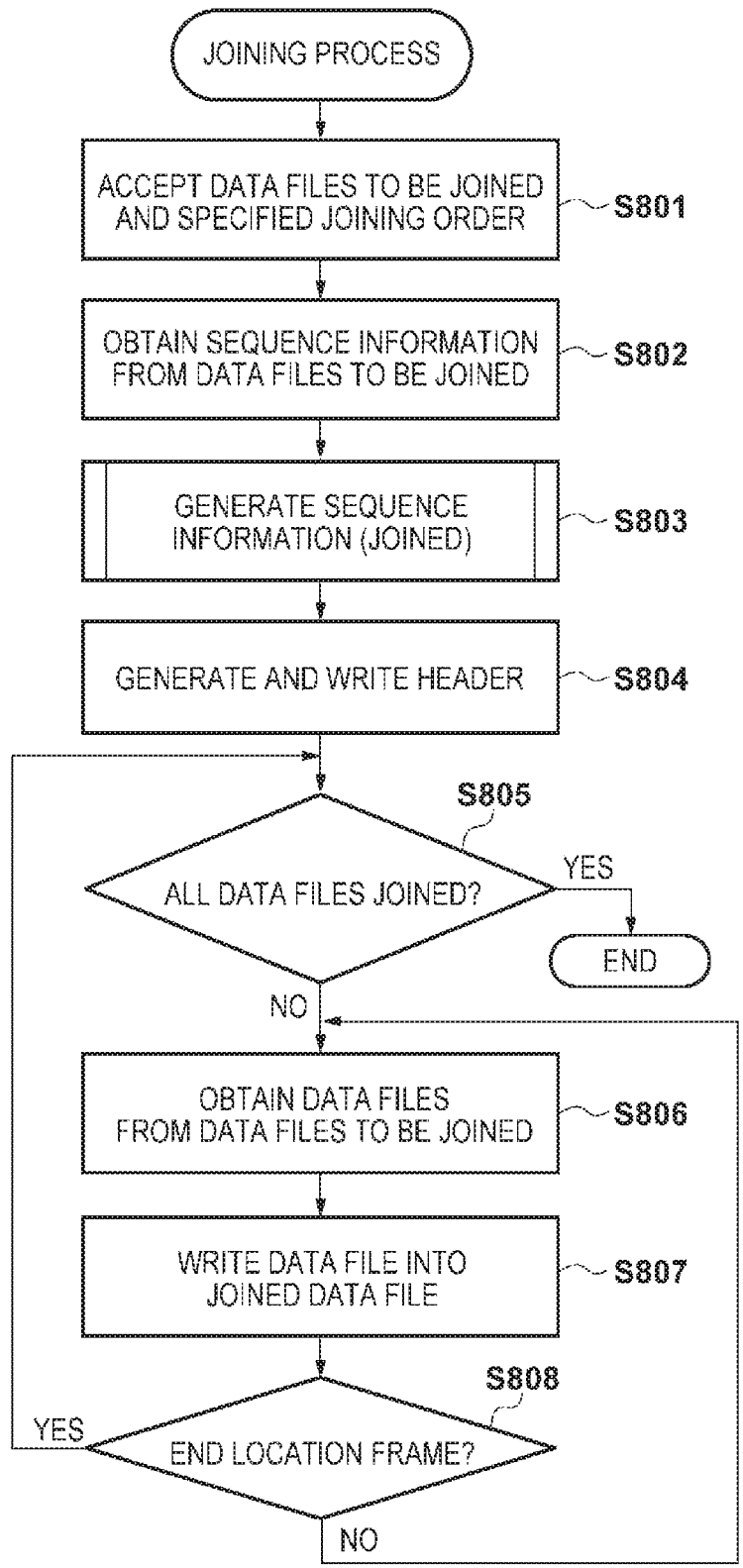

[Fig. 6B]
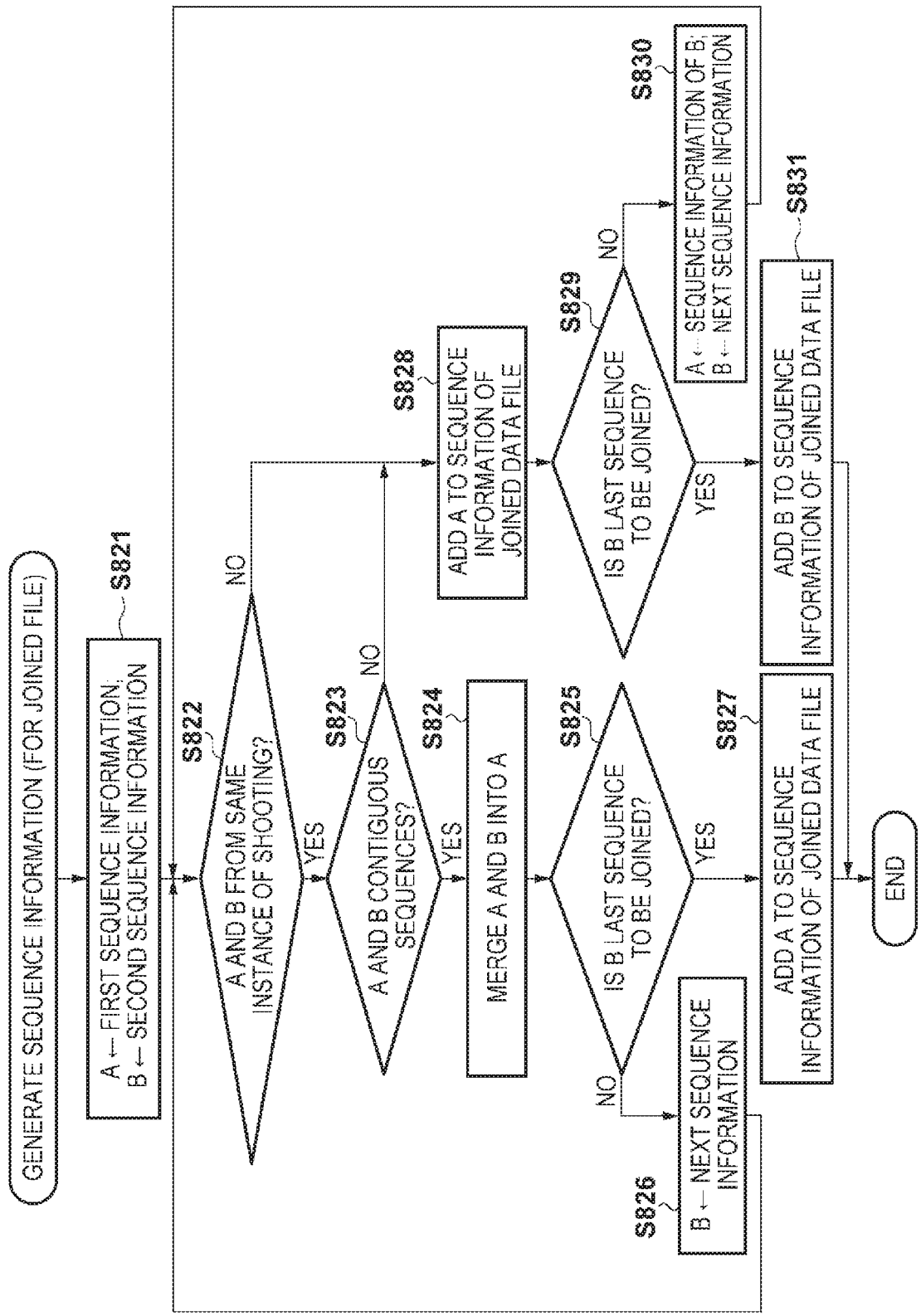

[Fig. 7A]

| | Shooting ID | Start Frame Index | End Frame Index | Total Frame Num | Past Processing Status |
|---|---|---|---|---|---|
| MOV_0001 | 1111111111111111 | 1 | 100 | 200 | 0x00000001 |
| MOV_0002 | 1111111111111111 | 101 | 200 | 200 | 0x00000001 |

⇒

| | Shooting ID | Start Frame Index | End Frame Index | Total Frame Num | Past Processing Status |
|---|---|---|---|---|---|
| CON_MOV_0002 | 1111111111111111 | 1 | 200 | 200 | 0x00000000 |

[Fig. 7B]

| | Shooting ID | Start Frame Index | End Frame Index | Total Frame Num | Past Processing Status |
|---|---|---|---|---|---|
| MOV_0003 | 2222222222222222 | 1 | 100 | 100 | 0x00000000 |

1001

| | Shooting ID | Start Frame Index | End Frame Index | Total Frame Num | Past Processing Status |
|---|---|---|---|---|---|
| MOV_0004 | 3333333333333333 | 1 | 50 | 50 | 0x00000000 |

1002

| | Shooting ID | Start Frame Index | End Frame Index | Total Frame Num | Past Processing Status |
|---|---|---|---|---|---|
| CON_MOV_0003 | 2222222222222222 | 1 | 100 | 100 | 0x00000000 |
| | 3333333333333333 | 1 | 50 | 50 | 0x00000000 |

1003

[Fig. 8]
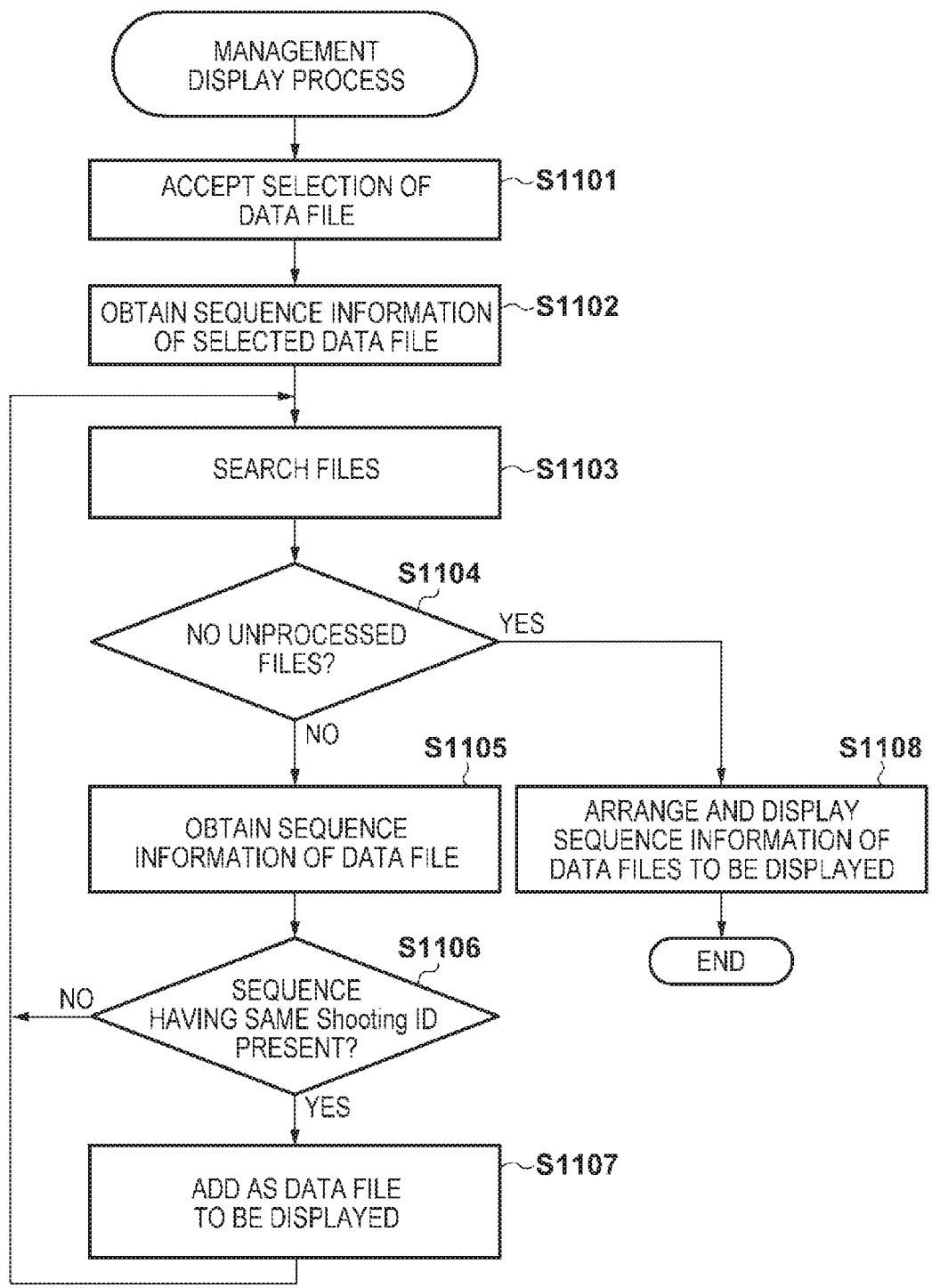

[Fig. 9A]
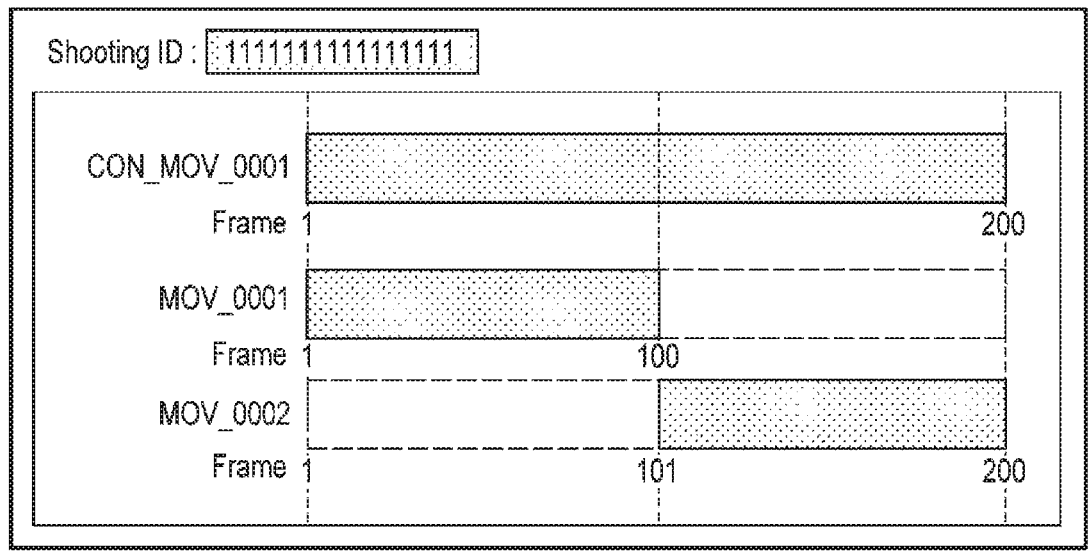
[Fig. 9B]
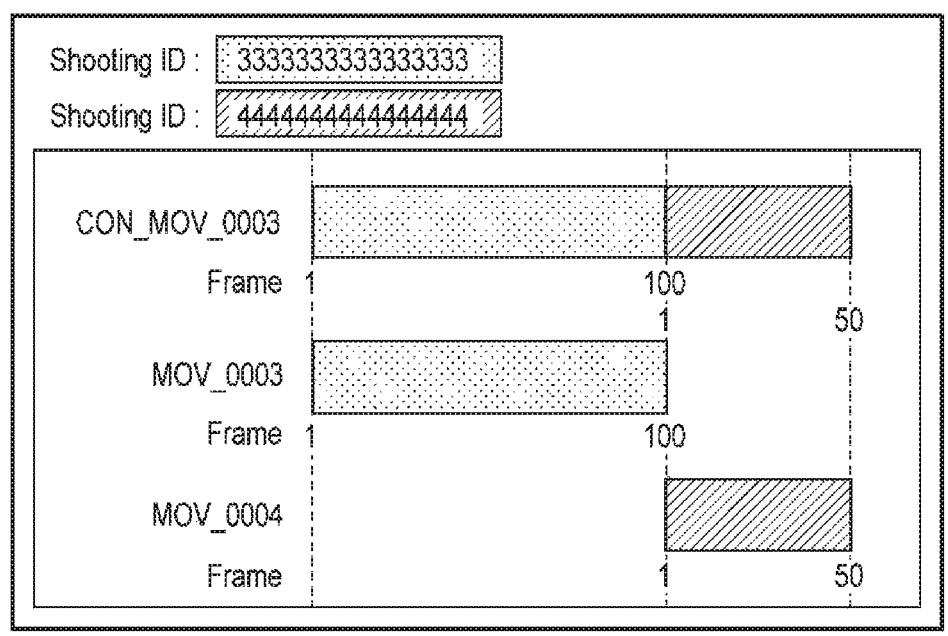

[Fig. 10A]
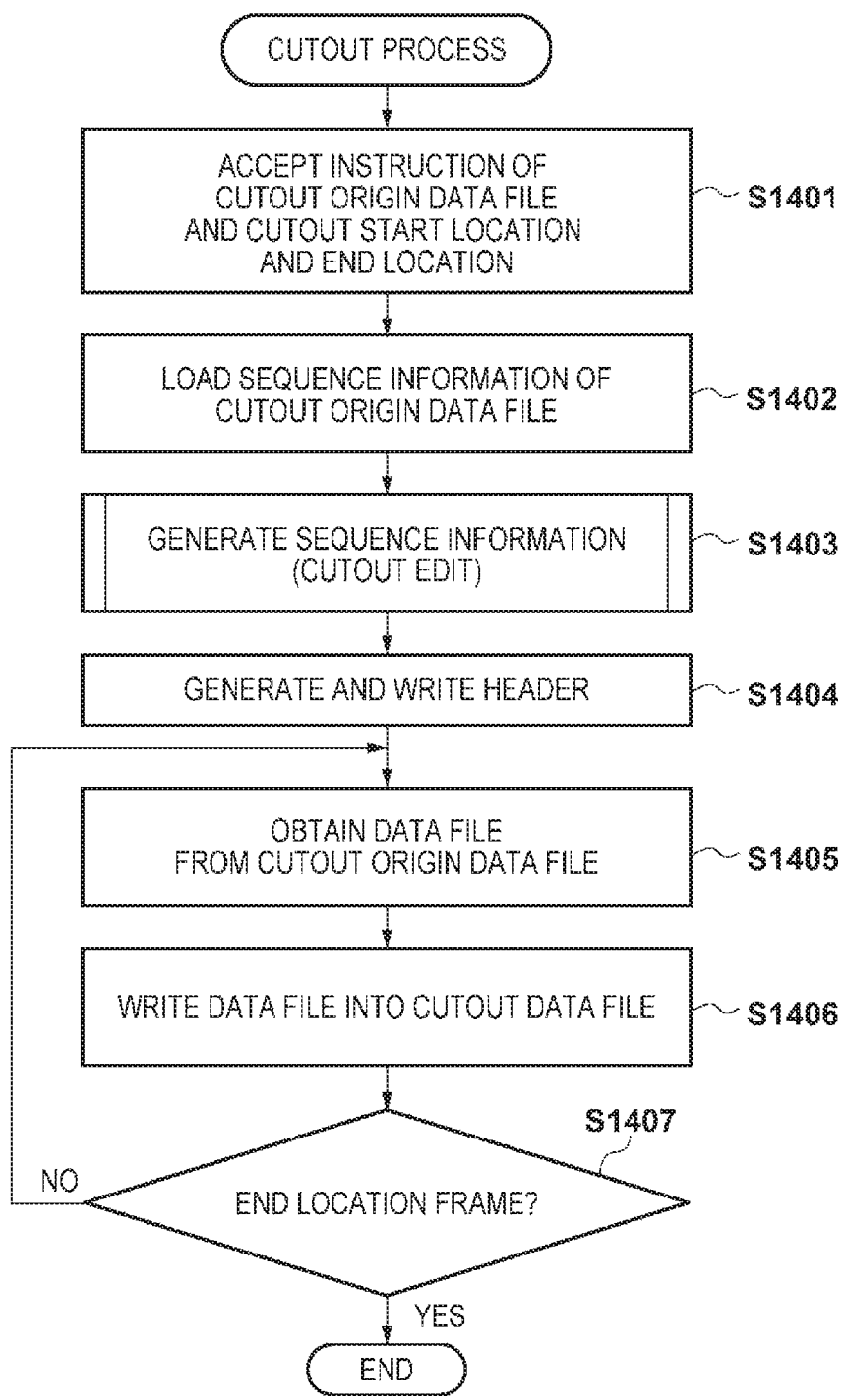

[Fig. 10B]
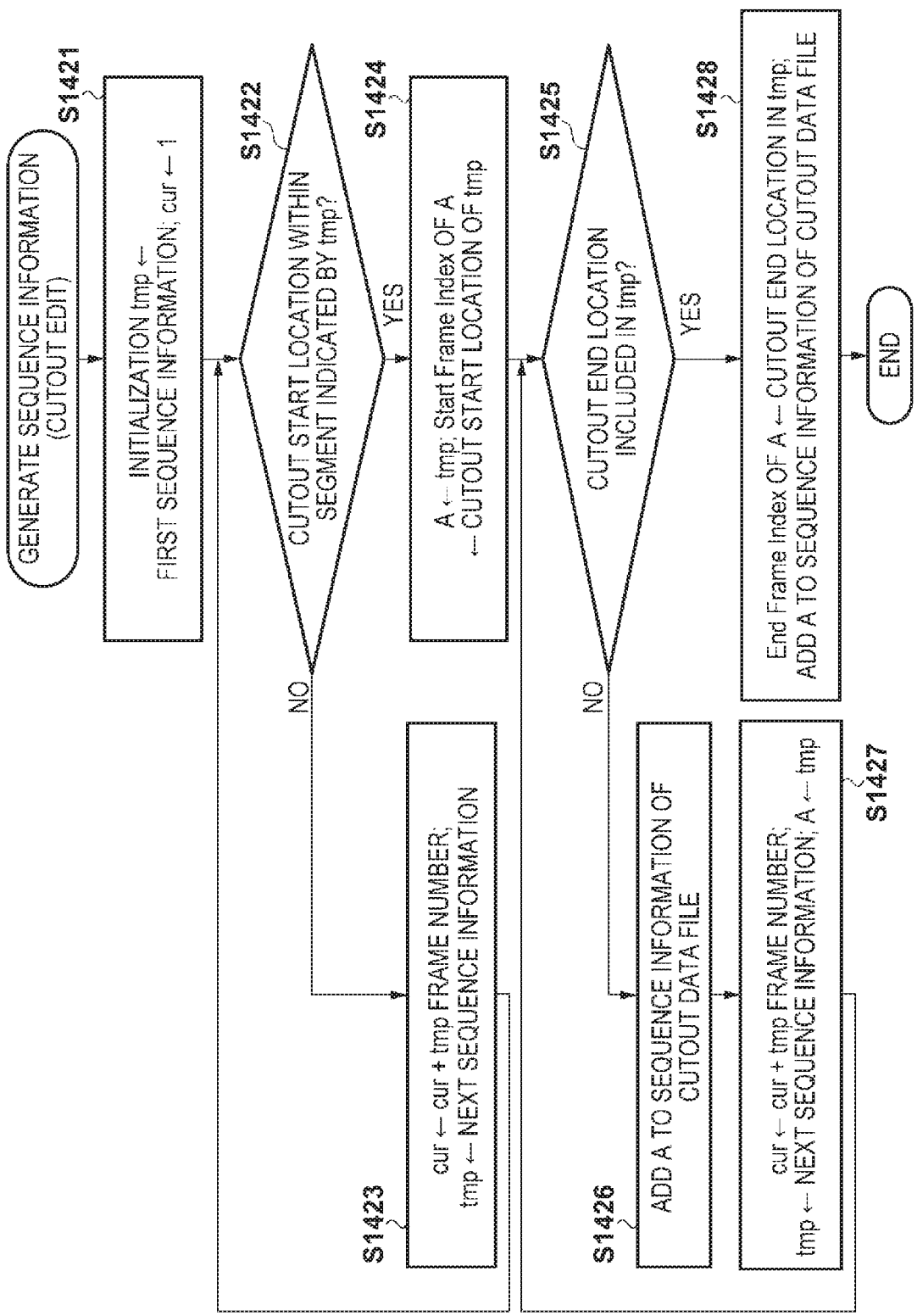

[Fig. 11A]
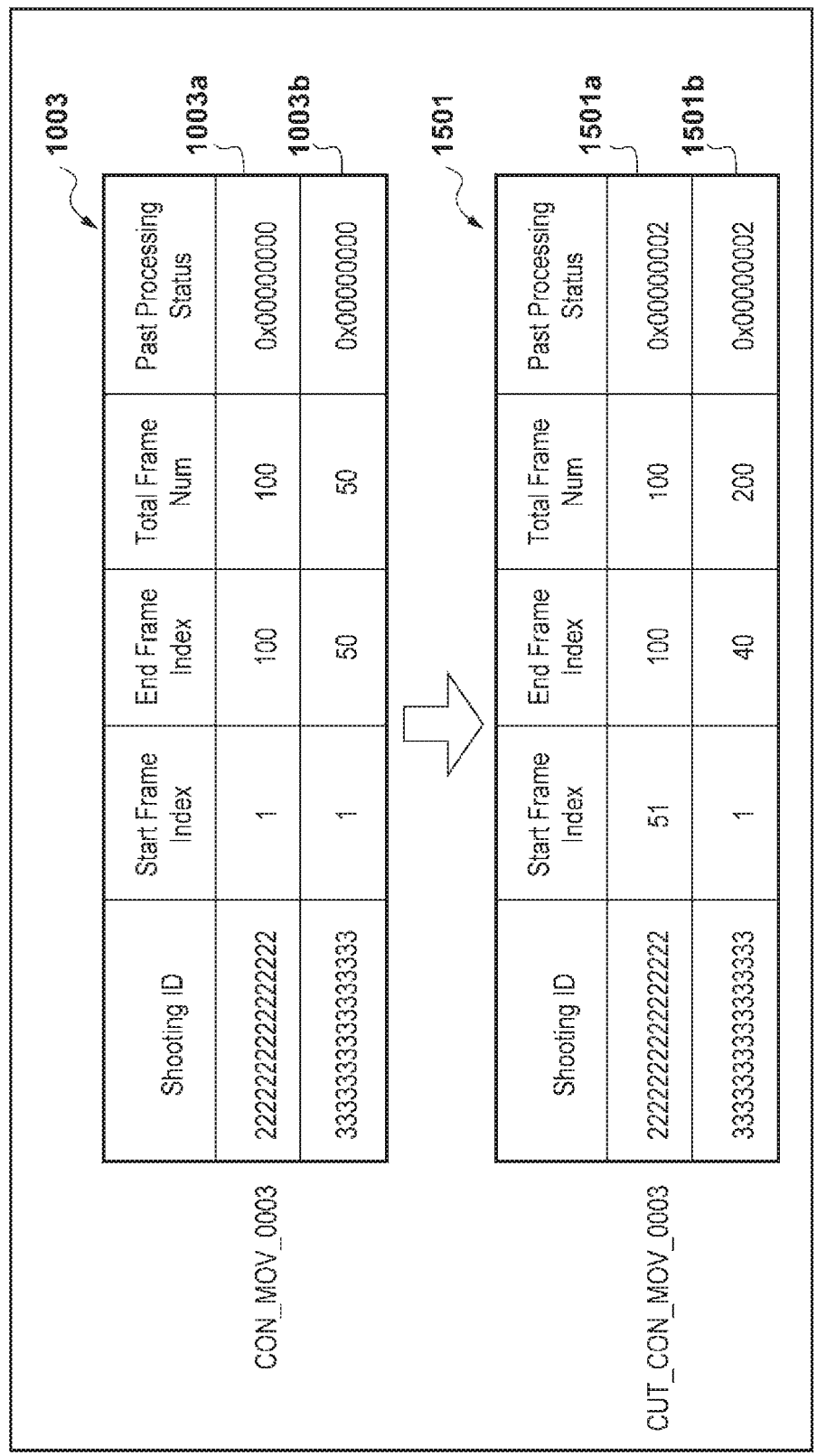

[Fig. 11B]
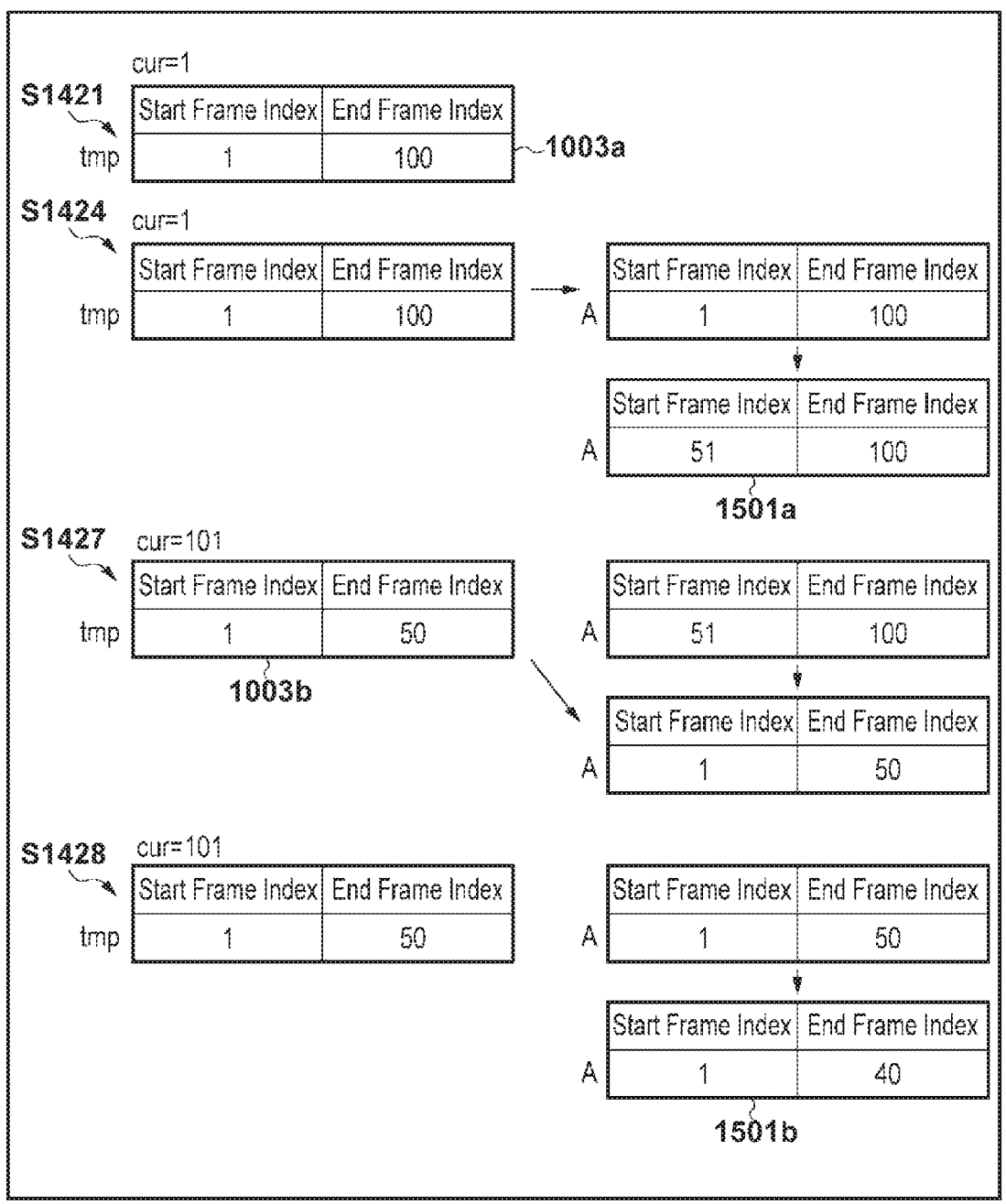

[Fig. 12]
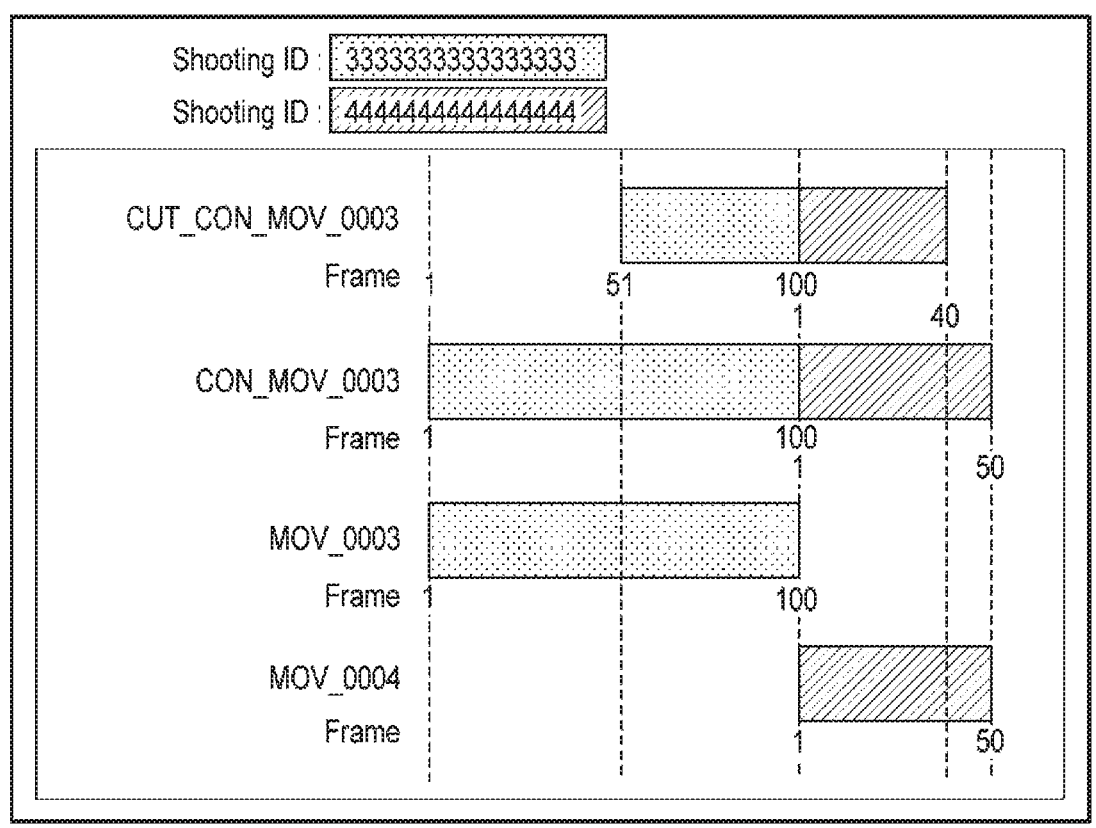

DATA STRUCTURE, INFORMATION PROCESSING APPARATUS, AND CONTROL METHOD THEREOF

CROSS-REFERENCE TO RELATED APPLICATIONS

This application is a national stage application of International Application No. PCT/JP2017/013502 filed Mar. 31, 2017, whose benefit is claimed and which claims the benefit of Japanese Patent Application No. 2016-074600, filed Apr. 1, 2016, the entire disclosure of which are incorporated herein by reference.

TECHNICAL FIELD

The present invention relates to a data structure, an information processing apparatus, and a control method thereof, and particularly relates to a technique for handling moving image data.

BACKGROUND ART

It has recently become possible to easily edit moving images on small electronic devices such as smartphones. However, because multiple moving images having edits with slight differences are often generated, it is easy for a large amount of edited moving image data to be produced from a single piece of original moving image data. Managing edited moving image data has thus been a troublesome process.

Japanese Patent Laid-Open No. 2006-157343 discloses a configuration in which, when still image data based on moving image frame data is generated, identification information of the original moving image data is recorded into the header of the still image data along with frame offset information indicating what number frame from the start of the original moving image data the data that is used came from.

The configuration disclosed in Japanese Patent Laid-Open No. 2006-157343 makes it possible to understand a relationship between edited image data and original moving image data at the frame level. However, the edited image data is limited to still image data, and the document does not disclose a configuration for a case where the edited image data is moving image data. With moving image data, there are cases where one piece of edited moving image data is used to generate a further instance of edited moving image data. Thus different considerations must be made compared to a case where still image data is generated.

SUMMARY OF INVENTION

Having been achieved in light of such problems with past techniques, the present invention provides a data structure that makes it easy to understand a relationship between pre- and post-editing moving image data at the frame level, an information processing apparatus that handles such a data structure, and a control method for the information processing apparatus.

According to an aspect of the present invention, there is provided a data structure of a data file for storing moving image data, the data structure comprising: an area for the moving image data, and an area, different from the area for the moving image data, for associated information related to the moving image data, wherein the associated information includes identification information for identifying a data file that contains a related moving image data being related to the moving image data, and information specifying a segment of frames of the moving image data.

According to another aspect of the present invention, there is provided an information processing apparatus comprising: obtainment means for obtaining moving image data; and generating means for generating a data file for moving image data, wherein the generating means generates a data file having the data structure according to the present invention.

According to a further aspect of the present invention, there is provided an information processing apparatus comprising: obtainment means for obtaining a first data file having the data structure according to the present invention; and generating means for generating second and third data files, having the data structure, that stores the moving image data stored in the first data file in a divided fashion, wherein as the associated information, the generating means: records the same identification information as the first data file and information specifying a first segment of frames in the second data file; and records the same identification information as the first data file and information specifying a second segment of frames that follows the first segment of frames in the third data file.

According to a yet further aspect of the present invention, there is provided an information processing apparatus comprising: obtainment means for obtaining first and second data files having the data structure according to the present invention; and generating means for generating a third data file for moving image data obtained by joining moving image data stored in the first data file and moving image data stored in the second data file, wherein in the case where, on the basis of the identification information and the information specifying a segment of frames, it is determined that the moving image data stored in the first and second data files is moving image data from contiguous segments of frames, the generating means records information specifying the contiguous segments of frames as information specifying the segment of frames recorded in the third data file.

According to another aspect of the present invention, there is provided an information processing apparatus comprising: obtainment means for obtaining a first data file having the data structure according to the present invention; and generating means for generating a second data file by cutting out part of the moving image data stored in the first data file, wherein the generating means changes the associated information of the first data file so that the information specifying a segment of frames specifies a post-cutout segment and records the changed associated information as the associated information of the second data file.

According to a further aspect of the present invention, there is provided an information processing apparatus comprising: specifying means for specifying, among a plurality of data files stored in storage means and having the data structure according to the present invention, a data file whose associated information meets a designated condition; and display means for displaying at least the information specifying a segment of frames in a comparable manner on the basis of the designated data file and the associated information of the specified data file.

According to a yet further aspect of the present invention, there is provided a control method for an information processing apparatus, the method comprising: obtaining moving image data; and generating a data file for storing moving image data, wherein the step of generating generates a data file having the data structure according to the present invention.

According to another aspect of the present invention, there is provided a control method for an information processing apparatus, the method comprising: obtaining a first data file having the data structure according the present invention; and generating second and third data files, having the data structure, for storing the moving image data stored in the first data file in a divided fashion, wherein the generating includes: recording the associated information including the same identification information as the first data file and information specifying a first segment of frames in the second data file; and recording the associated information including the same identification information as the first data file and information specifying a second segment of frames that follows the first segment of frames in the third data file.

According to a further aspect of the present invention, there is provided a control method for an information processing apparatus, the method comprising: obtaining first and second data files having the data structure according to the present invention; and generating a third data file for storing moving image data obtained by joining moving image data stored in the first data file and moving image data stored in the second data file, wherein the generating includes: determining, on the basis of the identification information and the information specifying a segment of frames, whether or not the moving image data stored in the first and second data files is moving image data from contiguous segments of frames; and recording, in the case where it has been determined whether or not the moving image data stored in the first and second data files is moving image data from contiguous segments of frames, information specifying the contiguous segments of frames as information specifying the segment of frames recorded in the third data file.

According to a yet further aspect of the present invention, there is provided a control method for an information processing apparatus, the method comprising: obtaining a first data file having the data structure according to the present invention; and generating a second data file by cutting out part of the moving image data stored in the first data file, wherein the generating includes: changing the associated information of the first data file so that the information specifying a segment of frames specifies a post-cutout segment; and recording the changed associated information as the associated information of the second data file.

According to another aspect of the present invention, there is provided a control method of an information processing apparatus, the method comprising: specifying, among a plurality of data files stored in storage means and having the data structure according to the present invention, a data file whose associated information meets a designated condition; and displaying at least the information specifying a segment of frames in a comparable manner on the basis of the designated data file and the associated information of the specified data file.

According to a further aspect of the present invention, there is provided a program that causes a computer to function as the respective means of the information processing apparatus according to the present invention.

Further features of the present invention will become apparent from the following description of exemplary embodiments (with reference to the attached drawings).

BRIEF DESCRIPTION OF DRAWINGS

FIGS. 1A and 1B are diagrams illustrating an example of the functional configuration of a digital camera according to an embodiment, and an external view of a rear surface of the digital camera, respectively.

FIGS. 1A and 1B are diagrams illustrating an example of the functional configuration of a digital camera according to an embodiment, and an external view of a rear surface of the digital camera, respectively.

FIG. 2 is a diagram schematically illustrating a memory map of the digital camera according to the embodiment.

FIGS. 3A and 3B are diagrams illustrating the configuration of a data file generated by the digital camera according to the embodiment, and an example of sequence information, respectively.

FIGS. 3A and 3B are diagrams illustrating the configuration of a data file generated by the digital camera according to the embodiment, and an example of sequence information, respectively.

FIGS. 4A and 4B are flowcharts illustrating a series of operations performed by the digital camera according to the embodiment.

FIGS. 4A and 4B are flowcharts illustrating a series of operations performed by the digital camera according to the embodiment.

FIG. 5 is a block diagram illustrating an example of the functional configuration of a PC according to the embodiment.

FIGS. 6A and 6B are flowcharts illustrating operations of a joining process according to the embodiment.

FIGS. 6A and 6B are flowcharts illustrating operations of a joining process according to the embodiment.

FIGS. 7A and 7B are diagrams illustrating the generation of sequence information involved in the joining process according to the embodiment.

FIGS. 7A and 7B are diagrams illustrating the generation of sequence information involved in the joining process according to the embodiment.

FIG. 8 is a flowchart illustrating a management display process according to the embodiment.

FIGS. 9A and 9B are diagrams illustrating an example of a display made in the management display process according to the embodiment.

FIGS. 9A and 9B are diagrams illustrating an example of a display made in the management display process according to the embodiment.

FIGS. 10A and 10B are flowcharts illustrating a cutout process according to the embodiment.

FIGS. 10A and 10B are flowcharts illustrating a cutout process according to the embodiment.

FIGS. 11A and 11B are diagrams illustrating the generation of sequence information involved in the cutout process according to the embodiment.

FIGS. 11A and 11B are diagrams illustrating the generation of sequence information involved in the cutout process according to the embodiment.

FIG. 12 is a diagram illustrating an example of a display made in the management display process according to the embodiment.

DESCRIPTION OF EMBODIMENTS

Exemplary embodiments of the present invention will now be described in detail in accordance with the accompanying drawings.

First Embodiment

Hereinafter, an exemplary embodiment of the present invention will be described in detail with reference to the appended drawings. In these descriptions, a digital camera is given as an example of an information processing apparatus having functions for generating and recording moving image data, and a personal computer (PC) is given as an example of an information processing apparatus having functions for editing and managing image data. However, the same information processing apparatus may have the functions for generating, editing, and managing moving image data. Furthermore, a shooting function is not required with respect to the generation of moving image data according to the present embodiment.

As such, the operations involved in generating, editing, and managing moving image data described hereinafter can be carried out by a typical electronic device. Digital (video) cameras, cellular phones (including smartphones), tablet devices, game consoles, personal computers, media players, and television receivers can be given as examples of such an electronic device, but these are merely examples.

FIG. 1A illustrates an example of the functional configuration of a digital camera 100 according to an embodiment of the present invention, and FIG. 1B illustrates an example of the external appearance of a rear surface of the digital camera 100.

An image capturing unit 113 includes an image sensor, a lens group, and the like, and generates an image signal by converting a subject image into an electrical signal using a plurality of pixels included in the image sensor. The shooting operations performed by the image capturing unit 113 are controlled by a CPU 101.

The CPU 101 is a control unit of the digital camera 100. By loading programs stored in ROM 102 into DRAM 103 and executing those programs, the CPU 101 controls the function blocks of the digital camera 100 to implement the functions of the digital camera 100.

The ROM 102 is non-volatile memory that stores programs executed by the CPU 101, various types of setting values, default values, GUI data, and the like, and may be at least partially rewritable.

The DRAM 103 is volatile memory used as a temporary storage area, such as a work area for the CPU 101 or buffer memory.

A real-time clock 104 is an internal timer of the digital camera 100, and provides the year, month, day, hour, and minute, the day of the week, and so on. The real-time clock 104 is used to calibrate event timers of the CPU 101, generate timestamps, and so on.

A memory card interface (IF) 105 is a reader/writer for a memory card 106, which is an example of a recording medium. The memory card IF 105 has a card slot for mounting the memory card 106. Reading from and writing to the memory card 106 through the memory card IF 105 is controlled by the CPU 101.

An operation unit 107 is an input device group through which a user makes various types of instructions, settings, and so on in the digital camera 100. The operation unit 107 typically includes buttons, switches, a touch panel, a dial, and so on, but is not limited to physical input devices, and may include a configuration for realizing voice-controlled input, eye-controlled input, or the like.

FIGS. 1A and 1B illustrate a power button 108, various menu buttons 109 (a combination of a menu button, a directional key, a set/OK key, and so on), a release button 110, a moving image shooting instruction button 111, and a playback mode button 112 as parts of the operation unit 107.

A communication unit 117 is a wired and/or wireless communication interface through which the digital camera 100 communicates with an external device. USB and HDMI (trade name), which are wired communication standards, and Bluetooth (trade name) and IEEE 802.11, which are wireless communication standards, can be given as examples of standards supported by the communication unit 117, but the standard is not limited thereto.

A signal processor 114 is a microprocessor optimized for signal processing, image processing, and the like, and in the present embodiment realizes the functions of an image processing unit 115 and a codec 116. The image processing unit 115 carries out typical image processing in the digital camera. Specifically, this includes A/D conversion, noise removal, demosaicing (color interpolation), white balance adjustment, optical distortion correction, gradation correction, color space conversion, resolution conversion, subject detection (face detection), and AF evaluation value calculation, but is not limited thereto. The codec 116 encodes and decodes data according to a predetermined format. The encoding formats supported by the codec 116 are not particularly limited. In the present embodiment, a proprietary RAW compression format, H.264 (or HPEG-4AVC), H.265 (or HEVC), and MotionJpeg are included as encoding formats, but the encoding format is not limited thereto.

Although not illustrated in FIGS. 1A and 1B, the digital camera 100 is provided with an audio pickup device (a microphone), and audio inputted through the microphone is subjected to A/D conversion by the image processing unit 115 as well as encoding and decoding by the codec 116.

A display unit 120 is a liquid crystal display (LCD), for example, and may be provided with a touch panel as well. Software keys and buttons may be realized as a part of the operation unit 107 by combining the touch panel with a GUI displayed in the display unit 120. During shooting standby and while shooting a moving image, the shot moving image can be displayed in the display unit 120 in real time, which enables the display unit 120 to be used as an electronic viewfinder. The display unit 120 also displays a menu screen for making settings, statuses and setting values of the digital camera 100, image data stored in the memory card 106, and so on.

The above-described function blocks are connected to each other by a bus 121, which makes it possible for the CPU 101 to control the function blocks and for the function blocks to communicate with each other. Note that FIGS. 1A and 1B schematically illustrate some of the function blocks in the digital camera 100 that are necessary to describe the embodiment.

FIG. 2 is a diagram schematically illustrating a memory map of the DRAM 103 during operation of the digital camera 100. Upon the digital camera 100 being turned on, the CPU 101 loads programs into the DRAM 103 from the ROM 102 and executes those programs. In the present embodiment, the CPU 101 implements functions of the digital camera 100 by executing a basic control program 301, a shooting control program 302, an image file control program 303, and a sequence information control program 304.

The basic control program 301 implements processing involved in user inputs/outputs made through the operation unit 107, basic user interface processing, file I/O processing, and so on. The shooting control program 302 is a program for implementing various types of functions related to the shooting of moving images, still images, and the like, and is a program involved primarily in the operational details and timing control of the image capturing unit 113 and the signal processor 114.

The image file control program 303 is a program for implementing operations of storing image data obtained through shooting and data generated on the basis of image data in a data file of a specific format (described later) and then recording that data file into the memory card 106. By executing the image file control program 303, the CPU 101 finds, during playback, desired data (including sequence information, which will be described later) within a data file, metadata required for the playback, and so on in accordance with rules for finding data. Additionally, by executing the image file control program 303, the CPU 101 records, when recording a data file, specific data into a specific location of a data file.

The sequence information control program 304 is a program for implementing functions for generating, loading, and updating sequence information. "Sequence information" is information related to moving image data stored in a data file (associated information), and can include shooting identification information and information specifying a segment of frames. By executing the image file control program 303, the CPU 101 obtains the sequence information from the data file and supplies that information to the sequence information control program 304. Meanwhile, by executing the sequence information control program 304, the CPU 101 generates the sequence information related to the data file to be recorded and supplies the information to the image file control program 303. Furthermore, by executing the image file control program 303, the CPU 101 stores the sequence information in a specific location in the data file.

In FIG. 2, "working memory area 305" indicates not a program but a memory space for temporarily storing variables and the like necessary for executing the programs.

FIG. 3A is a diagram illustrating an example of the data structure of the data file generated by the digital camera 100 according to the present embodiment. The data file according to the present embodiment has a data structure based on a file format capable of expressing a plurality of pieces of image data in time series. Specifically, the data file has a container structure based on the ISO base media file format (ISO/IEC 14496-12) or a format compliant therewith.

The ISO base media file format has a container structure including a container box and sub-boxes that the container box contains. In FIG. 3A, a data file 400 indicates the container box, which is highest in the hierarchy. The data file 400 contains a file type box (ftyp) 401, a movie box (moov) 402, and a media data box (mdat) 407. The movie box 402 contains an extension box (uuid) 403 capable of storing proprietary metadata and a plurality of track boxes (trak) 405 and 406. The media data box 407 contains actual data. The extension box (uuid) 403 contains a sequence info box (sqif) 404.

In the ISO base media file format, the actual data is managed in units called samples, chunks, and tracks. A "track" is an image sequence, an audio sequence, or the like, and is a set of samples. A "sample" is an individual video frame, a time-contiguous series of video frames, or a time-contiguous compressed section of audio. A "chunk" is constituted of a contiguous set of samples for a given track, and is a unit by which the actual data the media data box 407 contains is managed. Refer to the ISO/IEC 14496-12 specification for further details on the ISO base media file format.

Accordingly, moving image data 408 and audio data 409 in the media data box 407 illustrated in FIG. 3A are managed in common units of time. A starting address of each chunk of the actual data for a given track is managed by an absolute offset from the start of the file (a chunk offset).

The type of the data file is indicated by a four-character identifier (a "brand") in the file type box 401. The identifier is a registration system and is managed internationally.

The movie box 402 is a container box that contains metadata (management information) related to the actual data that the media data box 407 contains.

The movie box 402 includes the following:
mvhd (movie header): creation time, modification time, timescale, duration, playback speed, volume, etc.; and
trak (track): a container box for a single track.

Additionally, each track box (trak) contains the boxes described below, which contain values based on predetermined setting values. These boxes and the information they contain are determined by the specifications, and thus the details thereof will not be described.
tkhd (track header): flags (whether or not the track is enabled), creation time, modification time, track ID, duration, layer, volume, track width/height, etc.;
mdia (media): a container box containing boxes related to media data within the track;
mdhd (media header): information that is media-independent and related to characteristics of the media within a track (creation time, modification time, timescale, duration, language, etc.);
hdlr (handler reference): a name or the like, recognizable by a person, related to the track type, such as the type of the media handler (the type of the track);
minf (media information): a container box containing characteristic information of the media within the track;
vmhd/smhd/hmhd/nmhd (media information header): one is provided according to the track type. Information independent of the coding, such as a version.
dinf (data information): a container box containing boxes related to the location of media information in the track;
dref (data reference): version, entry count, entry format version, data entry name (URN) or data entry location (URL);
stbl (sample table): a sample table containing all time and data indexes of the media samples in the track;
stsd (sample description): detailed information regarding the encoding format and initialization information;
stts (time-to-sample): table for converting from decoding times to sample numbers;
stsc (sample-chunk): information for finding the chunk that contains a given sample from that sample (sample count per chunk, for example);
stsz (sample size): sample count and data size (bytes) of each sample; and
stco (chunk offset): table of location information for each chunk in the file.

For the sake of simplicity, FIG. 3A only illustrates the track boxes 405 and 406 for the data that the media data box 407 contains. The boxes aside from the above-described boxes may be included in the movie box 402, the extension box 403, and the track boxes 405 and 406. In the present embodiment, the track boxes 405 and 406 contain metadata related to the moving image data and audio data that the media data box 407 contains.

FIG. 3B illustrates an example of the structure of the sequence information used in the present embodiment.

500 indicates an example of sequence information recorded into a data file that contains the overall moving image data obtained from a single instance of shooting. The sequence information 500 indicates that the data file in which the sequence information 500 is recorded contains a segment of moving image data from a first to 100th frames obtained through a single instance of shooting, as well as a positional relationship between that segment of frames and the overall moving image data obtained through that instance of shooting. "Single instance of shooting" refers to a continuous period of shooting started in response to a shooting start instruction. In the case where shooting is temporarily stopped and then started again, the shooting may be considered continuous if the time for which the shooting is stopped is within a predetermined amount of time (several seconds, for example).

510 and 520 indicate examples of sequence information in the case where two data files contain moving image data obtained from a single instance of shooting. The sequence information 510 is recorded in the data file containing the first half of the moving image data (the first to 100th frames), and the sequence information 520 is recorded in the data file containing the second half of the moving image data (the 101st to 200th frames).

For example, the FAT32 filesystem has a maximum file size of 4 GB. Thus when using the FAT32 filesystem, if moving image data obtained from a single instance of shooting results in the file of the moving image data to be stored exceeding 4 GB, that moving image data is recorded across a plurality of data files. Split recording, in which a data file currently being recorded is finalized, a new data file is created, and the recording is continued, is called "file break recording". Namely, when file break recording occurs, moving image data obtained from a single instance of shooting are stored over a plurality of data files. The two data files in which the sequence information 510 and 520 are recorded contain a series of moving image resulting from file break recording.

Elements of the sequence information will be described next.

Shooting ID 501 is shooting identification information, and is unique information assigned to each instance of shooting (a unique value is used here). Thus a plurality of data files having the same value for the Shooting ID 501 means that the files contain moving image data from the same instance of shooting. Accordingly, the values of the Shooting ID 501 are the same in the sequence information 510 and 520 recorded into the plurality of data files through the file break recording indicated in FIG. 3B. In the present embodiment, a 16-byte numerical Universally Unique Identifier (UUID), which is widely employed as a generic unique identifier, is used for the Shooting ID 501. However, a value in any desired format that can be used as an identifier can be used for the Shooting ID 501.

Start Frame Index 502 is a number indicating the starting frame of the moving image data recorded in the data file.

End Frame Index 503 is a number indicating the ending frame of the moving image data recorded in the data file.

The start Frame Index 502 and the End Frame Index 503 are information specifying the segment of frames of the moving image data. In the present embodiment, frame numbers obtained during shooting are used for the Start Frame Index 502 and the End Frame Index 503. Thus the values in the Start Frame Index 502 and the End Frame Index 503 express frame units indicating which segments in the overall moving image data obtained from the shooting the moving image data that the data file contains corresponds to.

For example, the data file in which the sequence information 520 is recorded contains a segment from the 101st frame to the 200th frame of overall moving image data obtained from shooting having a Shooting ID of 11111111111111111. Likewise, the data file in which the sequence information 510 is recorded contains a segment from the first frame to the 100th frame of overall moving image data obtained from shooting having a Shooting ID of 11111111111111111. The data file in which the sequence information 510 is recorded and the data file in which the sequence information 520 is recorded have the same Shooting ID value, indicating that the data files contain moving image data from the same instance of shooting.

Total Frame Num 504 indicates the total number of frames in moving image data obtained from the same instance of shooting. Based on the Total Frame Num 504, the Start Frame Index 502, and the End Frame Index 503, the moving image data that a data file stores can be understood as being all or part of the overall moving image data obtained from the same instance of shooting. In the case where the moving image data is only part, what part of the overall data is stored can also be understood. These elements also make it possible to determine, in the case where files are joined, whether the joining extends to the final frame.

The Start Frame Index 502 will always be 1 in the case where a single data file stores the overall moving image data obtained from the same instance of shooting, as in the sequence information 500. The End Frame Index 503 and the Total Frame Num 504 also have the same value (100, here).

On the other hand, in the case where the overall moving image data obtained from the same instance of shooting has undergone file break recording and been split into two files, the Start Frame Index 502 in the sequence information 510 of the data file storing the first half of the moving image data is 1, indicating the start of the overall data. An ending frame number (100) of the stored moving image data is set in the End Frame Index 503, and a total frame number (200) of the moving image data obtained from the shooting is set in the Total Frame Num 504. 101, obtained by adding 1 to the End Frame Index 503 in the sequence information 510, is set for the Start Frame Index 502 in the sequence information 520 of the data file storing the second half of the moving image data. The same value (200) is set in the End Frame Index 503 and the Total Frame Num 504 of the sequence information 520.

The sequence information further contains Past Processing Status 505. The Past Processing Status 505 expresses whether or not the moving image data that data file stores has been edited (is original) and what type of edits have been made. In the present embodiment, the Past Processing Status 505 is a 32-bit flag indicating the type (or presence/absence) of editing on a bit-by-bit basis, with a least significant bit being a 0th bit and a most significant bit being a 31st bit. An edit type is assigned to each bit, and edits that are active are indicated by "1". For example, a file division resulting from a file break is assigned to the least significant bit (the 0th bit), a cutout edit made along the time axis direction is assigned to the first bit, re-encoding is assigned to the second bit, and so on. Some of the bits may be used for other applications, such as indicating the generation of the edit (second generation, third generation, and so on) and the number of edits.

Thus a flag in which all 32 bits are 0, namely "0x00000000", is set for the Past Processing Status 505 in the data file storing the original overall image data. However, a flag in which the least significant bit, which is assigned to a file break, is 1, namely "0x00000001", is set for the Past Processing Status 505 in the sequence information 510 and 520 of the two data files storing the moving image data resulting from file break recording. It is thus easy to determine whether the stored image data has not been edited (processed) at all or has been edited (processed), and what type of edits have been made, on the basis of the value of the Past Processing Status 505.

<Recording Process of Digital Camera>

A series of operations involved in the shooting performed by the digital camera 100 will be described next using the flowcharts in FIGS. 4A and 4B. The processing illustrated in FIGS. 4A and 4B is started at a point in time when the digital camera 100 has been turned on in response to the power button 108 being manipulated and is operating in a shooting standby state. For the sake of simplicity, the following describes the processing, which is implemented by the CPU 101 executing specific programs, as being executed by those programs.

In S600, the CPU 101 (the basic control program 301) stands by for an operation to be made through the operation unit 107. When an operation is made through the operation unit 107, in S601, the CPU 101 (the basic control program 301) determines whether the operation is an operation for turning the power off. If the operation is an operation for turning the power off, the processing moves to S602, where a predetermined power off process is executed.

However, if the operation is not an operation for turning the power off, the processing moves to S603, where the CPU 101 (the basic control program 301) determines whether or not the moving image shooting instruction button 111 has been operated (whether or not a moving image recording start instruction has been input). If the operation is not the moving image shooting instruction button 111 being operated, the CPU 101 (the basic control program 301) carries out processing in accordance with the operation (S604) and then returns the processing to S600.

If the operation is the moving image shooting instruction button 111 being operated, the processing moves to S605, where the CPU 101 (the sequence information control program 304) generates the sequence information. Specifically, the CPU 101 (the sequence information control program 304) generates sequence information having the following details:

Shooting ID: a newly-generated UID
Start Frame Index: 1
Past Processing Status: 0x00000000

At this point in time, the End Frame Index and the Total Frame Num are not set. "UID" is a generic name for a unique identifier such as a Universal Label (UL), a Universally Unique Identifier (UUID), or a Unique Material Identifier (UMID).

In the present embodiment, the CPU 101 (the sequence information control program 304) uses, as the UID, a 16-byte Mat # included in a UMID generated through a method compliant with the "IEEE 1394 network method" specified by SMTPE-330M. However, the UID may be generated through another method, such as using a UUID generating routine provided by an OS or programming language. Note also that Shooting ID is not limited to being generated at the start of shooting, and can be generated at any time until the file is closed.

In S606, the CPU 101 (the image file control program 303) generates header information of the data file, specifically the information that the file type box 401 and the movie box 402 contain (including the sequence information generated in S605 or S615). Not all of the header information is generated at this time. Instead, only the information that can be generated (static information such as the resolution and bitrate of the moving image data, for example) is generated. The CPU 101 (the basic control program 301) also carries out a file opening process and writes the header information into the memory card 106.

In S607, the CPU 101 (the shooting control program 302) executes a moving image shooting process for a single frame and supplies an image signal read out from the image capturing unit 113 to the image processing unit 115.

In S608, the image processing unit 115 executes image processing independent of the encoding process carried out by the codec 116, such as A/D conversion and resolution conversion. Color interpolation (demosaicing) and white balance adjustment are also carried out in the case where the moving image is recorded in a format aside from RAW. In the case where audio is recorded along with the moving image, the image processing unit 115 also carries out processing such as A/D conversion and noise reduction on the audio signal.

In S609, the codec 116 encodes the image (and audio) data input from the image processing unit 115. In the case where inter-frame predictive encoding is used, the process of S609 is not necessarily applied to the moving image frame shot immediately previous. The codec 116 writes the encoded data into the working memory area 305 of the DRAM 103.

In S610, the CPU 101 (the image file control program 303) passes a predetermined write unit of the encoded data held in the working memory area 305 of the DRAM 103 to the basic control program 301. The CPU 101 (the basic control program 301) records the data into the memory card 106. Note that the CPU 101 (the image file control program 303) counts the number of frames in order from the point in time when recording is started.

The configuration described here is one in which data is recorded sequentially into the memory card 106 in order to prevent the loss of shot data, realize the processing using a low-capacity DRAM 103, and so on. However, in the case where the DRAM 103 has a sufficiently high capacity, the case where there are no restrictions on processing time, or the like, the shot data may be buffered in the DRAM 103 until the recording ends and then written into the data file all at once.

In S611, the CPU 101 (the shooting control program 302) determines whether or not the moving image shooting instruction button 111 has been pressed (whether or not a moving image shooting stop instruction has been input). If the moving image shooting stop instruction has been input, the shooting operations are ended and the processing moves to S612.

In S612, the CPU 101 (the sequence information control program 304) updates, using the basic control program 301, the sequence information contained in the sequence info box 404 within the movie box 402 in the header portion of the data file. Specifically, the CPU 101 (the sequence information control program 304) overwrites the values of the End Frame Index and the Total Frame Num with the total frame number from the start of recording.

In the case where the least significant bit of the Past Processing Status is 1, indicating file break recording, the CPU 101 (the sequence information control program 304) also executes the following operations in S612. The CPU 101 overwrites the End Frame Index in the data file storing the moving image data obtained from the same instance of shooting (the data file having the same value for the Shooting ID) with the total frame number from the start of recording.

The size of the data that the movie box (moov) 402 contains is variable. As such, in the present embodiment, the extension box (uuid) 403 is arranged at the start of the movie box (moov) 402, and the sequence info box (sqif) 404 is arranged at the start of the extension box (uuid) 403. As a result, an offset value from the start of the file, for the starting location of the sequence info box (sqif) 404 and the starting location of the End Frame Index within the sequence info box 404, is a fixed value independent from the size of the movie box (moov) 402. This arrangement makes it possible to eliminate a process through which the image file control program 303 searches the sequence info box (sqif) 404 and a process through which the sequence information control program 304 searches for the location of the End Frame Index.

Once the process for updating the sequence information in S612 ends, the CPU 101 (the basic control program 301) carries out a process for closing the file, after which the processing returns to S600.

Meanwhile, if the moving image shooting instruction button 111 is not pressed (the moving image shooting stop instruction is not input) in S611, the CPU 101 (the shooting control program 302) moves the processing to S613.

In S613, the CPU 101 (the shooting control program 302) determines whether or not file break recording is necessary. If file break recording is determined to be necessary, the processing moves to S614. If file break recording is determined to be unnecessary, the processing returns to S607, and the next frame is processed.

For example, the CPU 101 (the shooting control program 302) can determine that file break recording is necessary in the case where the following holds true. However, the determination may be based on other conditions instead.

(size of data file already written into memory card 106+upper limit value for moving image data size and audio data size of one frame)>upper limit value of file size according to filesystem (4 GB in FAT32, for example)

In S614, the CPU 101 (the sequence information control program 304) updates, using the basic control program 301, the End Frame Index and the Past Processing Status in the sequence information that the sequence info box (sqif) 404 of the data file contains. The CPU 101 (the sequence information control program 304) updates the End Frame Index with a value obtained by adding the total frame number that the data file stores to the Start Frame Index. Additionally, the CPU 101 (the sequence information control program 304) updates Past Processing Status with a value in which the least significant bit assigned to file break recording is 1 (0x00000001). The CPU 101 (the basic control program 301) then carries out a process for closing the file, after which the processing moves to S615.

In S615, the CPU 101 (the sequence information control program 304) generates the sequence information to record into the data file that stores the next and subsequent frames of the moving image data. Specifically, the CPU 101 (the sequence information control program 304) sets the value of the Shooting ID, in the data file that was closed in S614 (that is, the previous data file), in the Shooting ID in the present data file. The CPU 101 (the sequence information control program 304) also sets a value 1 greater than the End Frame Index of the previous data file in the Start Frame Index of the present data file, and, as with the previous data file, sets a value indicating file break recording (0x00000001) in the Past Processing Status. The CPU 101 (the basic control program 301) then passes the sequence information generated in S615 to the image file control program 303, after which the processing returns to S606.

<Moving Image Joining Process>

A process for joining data files recorded as described above, and particularly a process for joining a plurality of data files recorded through file break recording, will be described next. In the present embodiment, editing of recorded data files is carried out using a personal computer (PC). Thus the PC that handles the data files will be described first.

FIG. 5 is a block diagram illustrating an example of the functional configuration of a PC 700 capable of handling data files recorded as described in the present embodiment.

A CPU 701 realizes the functions of the PC 700 by loading various programs stored in ROM 704 into RAM 705 and executing those programs. The various programs include a control program (operating system) 711, an image file control program 712, a sequence information control program 713, an application program 714, and so on.

An external storage device 702 is a hard disk, a memory card, or the like, and stores data files and so on. The "data files" referred to here are assumed to have the structure described with reference to FIG. 3A.

A communication unit 703 has a transmitter/receiver for communicating wirelessly with an external device according to a wireless communication standard such as Wi-Fi or Bluetooth (trade name), a transmitting/receiving circuit (an interface and a connector) for communicating with an external device according to a wired communication standard such as USB, and so on.

The ROM 704 stores programs executed by the CPU 701, GUI data, setting values, and so on. The ROM 704 may be at least partially rewritable.

The RAM 705 is a volatile memory, and is used as a work area, a buffer memory, and the like into which the CPU 701 loads programs. FIG. 5 illustrates a state in which data files are handled, and thus the various programs are loaded. Specifically, the control program 711, the image file control program 712, the sequence information control program 713, the application program 714, a decoding program 715, and an encoding program 716 are loaded. Part of the free space in the RAM 705 is illustrated as being a working memory area 717.

An operation input IF 706 controls connections with various input devices 709, such as a keyboard, a mouse, or a touchpad, and communicates details of user operations made through the input devices 709 to the PC 700. In the case where the display device 710 is a touch display, the display device 710 also constitutes one of the input devices 709.

A display IF 707 controls a connection with the display device 710, which is an LCD or the like.

The function blocks described above are communicatively connected to each other by a bus 708.

<File Joining Process>

The joining process carried out by the PC 700 will be described in detail next with reference to FIGS. 6A to 7B. A process of joining a plurality of data files obtained from file break recording (from the same instance of shooting) and a process of joining a plurality of data files stored as moving image data from different instances of shooting will be described as examples of the joining process.

First, operations carried out by the PC 700 in the joining process will be described using the flowcharts illustrated in FIGS. 6A and 6B.

The following also describes the processing steps realized by the CPU 701 executing specific programs as being executed by those programs. Additionally, the control program 711 is an OS, and the other programs 712 to 716 operate using basic functions provided by the control program 711.

In S801, the CPU 701 (the application program 714) displays data files stored in the external storage device 702 in the display device 710, in a form that can be selected using the input devices 709, for example. Here, only data files having the data structure described in the present embodiment are displayed, by specifying those data files using their extensions, for example. The data files are not limited to those stored in the external storage device 702, and may also be stored in an external device that can be communicated with using the communication unit 703. The data files to be joined and the order in which the data files are to be joined are specified through the input devices 709, whereupon the CPU 701 (the application program 714) moves the processing to S802.

In S802, the CPU 701 (the sequence information control program 713) loads the sequence information in the sequence info box (sqif) 404 for each of the data files to be joined that were selected in S801. As described above, the file offset of the sequence info box (sqif) 404 is a fixed and known value, and thus a process for specifying the location of the sequence info box (sqif) 404 need not be carried out. In the case where the location of the sequence info box (sqif) 404 is unclear, the CPU 701 (the image file control program 712) specifies a location. The CPU 701 (the sequence information control program 713) lists the obtained plurality of pieces of sequence information according to the specified joining order. In the case where a single data file stores a plurality of pieces of sequence information, the list is organized in the order in which the information was written.

In S803, the CPU 701 (the sequence information control program 713) generates sequence information to be written into the post-joining data file (the joined data file) from the list of sequence information generated in S802. The sequence information generating process carried out in S803 will be described in detail later with reference to FIG. 6B.

In S804, the CPU 701 (the application program 714) generates header information of the joined data file, specifically information that the file type box (ftyp) 401 and the movie box (moov) 402 contain. This information also includes the sequence information generated in S803. The CPU 701 (the control program 711) carries out a process for opening the file, and records the generated header information into the external storage device 702.

In S805, the CPU 701 (the application program 714) determines whether or not all the data files specified to be joined in S801 have been joined. If it is determined that all these data files have been joined, the CPU 701 (the control program 711) carries out a process for closing the file and the like, after which the processing ends. If, however, it is not determined that all the data files have been joined, the CPU 701 (the application program 714) moves the processing to S806.

In S806, the CPU 701 (the control program 711 and the application program 714) reads out the moving image data and audio data from the data file to be joined and writes that data into the working memory area 717 of the RAM 705. The method for obtaining the moving image data and audio data from a data file in the ISO base media file or a compatible format is known, and thus detailed descriptions thereof will be omitted.

In S807, the CPU 701 (the control program 711) writes the moving image data and audio data obtained in S806 from the RAM 705 into the joined data file that was opened in S804.

To simplify the descriptions and facilitate understanding, it is assumed here that the format of the image data and audio data is not changed during the joining process. However, the encoding method, compression rate, and so on can be changed. In this case, in S806, the CPU 701 (the decoding program 715) may decode the obtained moving image data and audio data; then, the CPU 701 (the encoding program 716) may encode the data decoded in S807 and write the data. In the case where the data is re-encoded during the joining process, the second bit in the Past Processing Status of the sequence information in the joined data file, which is assigned to a re-encoding edit, is set to 1. This makes it possible to know that the data has been converted from the original data.

In S808, the CPU 701 (the application program 714) determines whether all of the frames recorded in the currently-processed data file to be joined have been processed. If it is determined that all frames have been processed, the processing returns to S805 in order to move to the next data file to be processed. However, if it is not determined that all frames have been processed, the CPU 701 (the application program 714) returns the processing to S806 in order to move to the next frame to be processed.

Next, the sequence information generating process carried out in S803 will be described in detail with reference to the flowchart in FIG. 6B.

In S821, the CPU 701 (the sequence information control program 713) carries out an initialization process on the basis of the list of sequence information generated in S802. Specifically, the CPU 701 (the sequence information control program 713) stores the first sequence information in the list in sequence information A, and the second sequence information in sequence information B. The sequence information A and the sequence information B are both variables.

In S822, the CPU 701 (the sequence information control program 713) determines whether or not the sequence information A and the sequence information B are information related to the same instance of shooting, on the basis of the Shooting ID values thereof. If the Shooting ID value in the sequence information A and the Shooting ID value in the sequence information B are the same, it can be determined that the pieces of information are related to the same instance of shooting. The CPU 701 (the sequence information control program 713) moves the processing to S823 if the sequence information A and the sequence information B are determined to be information related to the same instance of shooting, and to S828 if the sequence information A and the sequence information B are not determined to be information related to the same instance of shooting.

In S823, the CPU 701 (the sequence information control program 713) determines whether or not the sequence information A and the sequence information B are information related to contiguous data on the basis of the End Frame Index value. If 1 added to the End Frame Index value of the sequence information A is the same as the value of the Start Frame Index in the sequence information B, the sequence information A and the sequence information B can be determined to be information related to contiguous data. The CPU 701 (the sequence information control program 713) moves the processing to S824 if the sequence information A and the sequence information B are determined to be information related to contiguous data, and to S828 if the sequence information A and the sequence information B are not determined to be information related to contiguous data.

In S824, the CPU 701 (the sequence information control program 713) replaces the End Frame Index in the sequence information A with the End Frame Index in the sequence information B so as to merge the sequence information B with the sequence information A. The sequence information A may instead be merged with the sequence information B by replacing the Start Frame Index in the sequence information B with the Start Frame Index in the sequence information A.

In the case where the merged sequence information (this will be assumed to be the sequence information A here) has a Start Frame Index of 1, and the End Frame Index and the Total Frame Num have the same value, the sequence information A expresses data for the overall instance of shooting. Accordingly, the CPU 701 (the sequence information control program 713) sets the file break flag (the least significant bit) of the Past Processing Status in the sequence information A to 0.

In S825, the CPU 701 (the sequence information control program 713) determines whether the sequence information B is the last sequence information in the list (that is, whether the sequence information is from the last data file that is to be joined). The CPU 701 (the sequence information control program 713) moves the processing to S827 if the sequence information is determined to be the last sequence information, and to S826 if the sequence information is not determined to be the last sequence information.

In S826, the CPU 701 (the sequence information control program 713) stores the next sequence information in the list in the sequence information B and returns the process to S822.

In S827, the CPU 701 (the sequence information control program 713) writes (adds) the merged sequence information A into the sequence info box (sqif) 404 of the joined data file, and then ends the processing.

In S828, the CPU 701 (the sequence information control program 713) writes (adds) the sequence information A into the sequence info box (sqif) 404 of the joined data file.

In S829, the CPU 701 (the sequence information control program 713) determines whether the sequence information B is the last sequence information in the list (that is, whether the sequence information is from the last data file that is to be joined), in the same manner as in S825. The CPU 701 (the sequence information control program 713) moves the processing to S831 if the sequence information is determined to be the last sequence information, and to S830 if the sequence information is not determined to be the last sequence information.

In S830, the CPU 701 (the sequence information control program 713) stores the sequence information B in the sequence information A and the next sequence information in the list in the sequence information B, and then returns the process to S822.

In S831, the CPU 701 (the sequence information control program 713) writes (adds) the sequence information B into the sequence info box (sqif) 404 of the data file resulting from the joining process, and then ends the processing.

A specific example of the sequence information written into the sequence info box (sqif) 404 of the joined data file through this file joining process will be described next with reference to FIGS. 7A and 7B.

First, the sequence information generated through the process for joining a plurality of data files obtained from file break recording (that is, obtained from the same instance of shooting) will be described with reference to FIG. 7A.

In FIG. 7A, the sequence information 510 and 520 of two data files MOV_0001 and MOV_0002 obtained from file break recording are the same as that illustrated in FIG. 5B. Sequence information 901 is sequence information that a joined data file CON_MOV_0001 obtained by joining the data files MOV_0001 and MOV_0002 stores.

It is assumed here that in S801, the data files MOV_0001 and MOV_0002 have been selected to be joined, and an instruction has been made to join the data file MOV_0001 and the data file MOV_0002 in that order. In this case, the sequence information generating process is carried out as follows in S803.

In S821, the CPU 701 (the sequence information control program 713) stores the sequence information 510 in the sequence information A and the sequence information 520 in the sequence information B.

Because the Shooting ID is the same value in the sequence information A and the sequence information B (1111111111111111), the CPU 701 (the sequence information control program 713) determines in S822 that the sequence information A and the sequence information B are information related to the same instance of shooting, and moves the processing to S823.

In S823, the CPU 701 (the sequence information control program 713) determines that the sequence information A and the sequence information B are information related to a contiguous sequence, and moves the processing to S824. This determination is based on the fact that a value obtained by adding 1 to the End Frame Index in the sequence information A (that is, 101) is the same as the value of the Start Frame Index in the sequence information B (101).

In S824, the CPU 701 (the sequence information control program 713) sets the value of the End Frame Index in the sequence information A to the value of the End Frame Index in the sequence information B (200) so as to merge the sequence information. The end Frame Index and the Total Frame Num in the sequence information A have the same value as a result of the merge. Accordingly, the CPU 701 (the sequence information control program 713) resets the least significant bit, indicating whether or not file break recording has been carried out, in the Past Processing Status in the sequence information A to 0. The sequence information A becomes the sequence information 901 illustrated in FIG. 7A as a result.

Next, in S825, the CPU 701 (the sequence information control program 713) determines that the sequence information B is the last sequence information in the list and moves the processing to S827.

In S827, the CPU 701 (the sequence information control program 713) adds the sequence information A to the sequence info box (sqif) 404 of the joined data file, and then ends the processing.

Next, the sequence information generated through the process for joining a plurality of data files storing moving image data from different instances of shooting will be described with reference to FIG. 7B.

In FIG. 7B, sequence information 1001 and 1002 are sequence information for two data files MOV_0003 and MOV_0004 that are to be joined. Sequence information 1003 is sequence information that a joined data file CON_MOV_0003 obtained by joining the data files MOV_0003 and MOV_0004 stores.

It is assumed here that in S801, the data files MOV_0003 and MOV_0004 have been selected to be joined, and an instruction has been made to join the data file MOV_0003 and the data file MOV_0004 in that order. In this case, the sequence information generating process is carried out as follows in S803.

In S821, the CPU 701 (the sequence information control program 713) stores the sequence information 1001 in the sequence information A and the sequence information 1002 in the sequence information B.

The value of Shooting ID of the sequence information A (2222222222222222) is different from the value of Shooting ID in the sequence information B (3333333333333333). Thus in S822, the CPU 701 (the sequence information control program 713) determines that the sequence information A and the sequence information B are not information related to the same instance of shooting, and moves the processing to S828.

In S828, the CPU 701 (the sequence information control program 713) writes (adds) the sequence information A into the sequence info box (sqif) 404 of the joined data file.

In S829, the CPU 701 (the sequence information control program 713) determines that the sequence information B is the last sequence information in the list and moves the processing to S831.

In S831, the CPU 701 (the sequence information control program 713) writes (adds) the sequence information B into the sequence info box (sqif) 404 of the data file resulting from the joining process, and then ends the processing.

As can be seen from FIG. 7B, the sequence information 1003 contains the sequence information 1001 of the data file MOV_0003 and the sequence information 1002 of the data file MOV_0004 that are to be joined. Thus in the case where data files from different instances of shooting are to be joined, the sequence info box (sqif) 404 of the joined data file contains a plurality of pieces of sequence information. By referring to the sequence info box (sqif) 404 of the joined data file CON_MOV_0003, it can be seen that that file has been obtained by joining data files from different instances of shooting.

<Management Process (Joined Data File)>

Next, an example of management display operations, serving as an example of data file management operations executed by the PC 700, will be described with reference to FIGS. 8 to 9B to illustrate the utility of the data file structure according to the present embodiment.

FIG. 8 is a flowchart illustrating operations in the management display process, which are carried out by the PC 700.

The following also describes the processing steps realized by the CPU 701 executing specific programs as being executed by those programs. Additionally, the control program 711 is an OS, and the other programs 712 to 716 operate using basic functions provided by the control program 711.

In S1101, the CPU 701 (the application program 714) displays data files stored in the external storage device 702 in the display device 710, in a form that can be selected using the input devices 709, for example. This process is the same as that of S801. Upon a single data file being selected through the input devices 709, the CPU 701 (the application program 714) moves the processing to S1102.

In S1102, the CPU 701 (the sequence information control program 713) loads the sequence information in the sequence info box (sqif) 404 of the data file selected in S1101. As described above, the file offset of the sequence info box (sqif) 404 is a fixed and known value, and thus a process for specifying the location of the sequence info box (sqif) 404 need not be carried out. In the case where the location of the sequence info box (sqif) 404 is unclear, the CPU 701 (the image file control program 712) specifies a location. The sequence information loaded here serves as a reference for the management display.

In S1103, the CPU 701 (the application program 714) searches the data files recorded in the external storage device 702 for a data file that both has the data structure according to the present embodiment and has not been selected in S1101.

In S1104, the CPU 701 (the application program 714) determines whether or not there is a data file, which is recorded in the external storage device 702 and has the data structure according to the present embodiment, on which the processing from S1105 on has not yet been carried out (that is, is unprocessed). The CPU 701 (the application program 714) moves the processing to S1108 if it is determined that there are no unprocessed data files, and moves the processing to S1105 if it is determined that there is an unprocessed data file.

In S1105 the CPU 701 (the sequence information control program 713) loads the sequence information in the sequence info box (sqif) 404 of the data file searched out in S1103. It is then determined whether or not the Shooting ID in the sequence information of the file selected in S1101, which was loaded in S1102, has the same value as the Shooting ID in the sequence information loaded in S1105. In the case where the data file selected in S1101 contains a plurality of pieces of sequence information, the CPU 701 (the sequence information control program 713) determines the value of the Shooting ID in the individual pieces of sequence information. The CPU 701 (the application program 714) moves the processing to S1107 if it is determined that the values of the Shooting IDs are the same, and moves the processing to S1103 if it is determined that the values of the Shooting IDs are different.

In S1107, the CPU 701 (the application program 714) takes the data file whose sequence information was loaded in S1105 as a data file to be displayed, adds the filename and the sequence information to a display information list, and then returns the processing to S1103.

In S1108, the CPU 701 (the application program 714) displays, in the display device 710 through the display IF 707, information indicating a relationship between the data file selected in S1101 and the data file selected to be displayed in S1107.

FIG. 9A is a diagram illustrating an example of the information displayed by the CPU 701 (the application program 714) in S1108 in the case where the joined data file CON_MOV_0001 has been selected in S1101. In this case, it is determined, as a result of the processing loop from S1103 to S1106, that the pre-joining data files MOV_0001 and MOV_0002 are to be displayed. Accordingly, the filenames and sequence information of the data files MOV_0001 and MOV_0002 are added to the display information list.

In the example illustrated in FIG. 9A, the Shooting ID, the filename, and the data segments that each data file stores are displayed in a comparative manner, for the selected data file and another data file having the same Shooting ID value as the selected data file.

With respect to the data segments, the values of the Start Frame Index and the End Frame Index are read out from the sequence information of each data file, and the frame number ranges are displayed in a comparative manner. In the example illustrated in FIG. 9A, the frame numbers use a shared axis and the data segments of the data files are represented by bands, which makes it possible to intuitively understand the relationship between the data segments that the related data files store. Additionally, the display format of the band-shape segments (color, pattern, or the like) is aligned with the display format of the corresponding Shooting ID. Here, all of the data files to be displayed have the same Shooting ID, and are therefore all displayed in the same display format. From the display illustrated in FIG. 9A, a user can understand at a glance that the data file CON_MOV_0001 is a data file obtained by joining the data files MOV_0001 and MOV_0002, which are data files from the same instance of shooting. The user can also understand at a glance the relationship between the moving image data segments that the pre- and post-editing data files store, on a frame-by-frame basis.

FIG. 9B is a diagram illustrating an example of the information displayed by the CPU 701 (the application program 714) in S1108 in the case where the joined data file CON_MOV_0003 has been selected in S1101. In this case, it is determined, as a result of the processing loop from S1103 to S1106, that the pre-joining data files MOV_0003 and MOV_0004 are to be displayed. Accordingly, the filenames and sequence information of the data files MOV_0003 and MOV_0004 are added to the display information list.

Although the basic display format is the same as in FIG. 9A, the data files MOV_0003 and MOV_0004 joined to obtain the joined data file CON_MOV_0003 are from different instances of shooting, and thus a plurality of Shooting IDs are present. The display format is therefore different for each Shooting ID, and the band-shape segments expressing the data segments of each data file also have different display formats according to the corresponding Shooting ID. It is therefore possible to intuitively understand both the relationship between the data segments that related data files store and the relationship between the Shooting IDs. From the display illustrated in FIG. 9B, a user can, at a glance, understand that the data file CON_MOV_0003 is a data file obtained by joining the data files MOV_0003 and MOV_0004, which are data files from different instances of shooting. The user can also understand at a glance the relationship between the moving image data segments that the pre- and post-editing data files store, on a frame-by-frame basis.

Although FIGS. 9A and 9B illustrate a case where a joined data file has been selected, the same display is made regardless of which pre-joining data file of the joined data file has been selected. The information of the selected data file may be displayed first or last, or the joined data file, the original data file, or the like may be displayed first or last. In either case, the information of the selected data file can be displayed so as to be visually different (that is, having a different color, size, or the like) from the information of other data files.

<Cutout Process>

The cutout process carried out by the PC 700 will be described in detail next with reference to FIGS. 10A to 11B. The cutout process is a process of generating a new data file from part of another data file.

First, operations carried out by the PC 700 in the moving image cutout process will be described using the flowcharts illustrated in FIGS. 10A and 10B.

The following also describes the processing steps realized by the CPU 701 executing specific programs as being executed by those programs. Additionally, the control program 711 is an OS, and the other programs 712 to 716 operate using basic functions provided by the control program 711.

In S1401, the CPU 701 (the application program 714) displays data files stored in the external storage device 702 in the display device 710, in a form that can be selected using the input devices 709, for example. Here, only data files having the data structure described in the present embodiment are displayed, by specifying those data files using their extensions, for example. The data files are not limited to those stored in the external storage device 702, and may also be stored in an external device that can be communicated with using the communication unit 703. When a cutout source data file is selected through the input devices 709, the CPU 701 (the application program 714) displays, in the display device 710, a screen for specifying a cutout start location and end location. The screen for specifying the cutout start location and end location may be the same as a trimming screen displayed by a known video editing application. For example, the user specifies the cutout start location and end location on a frame-by-frame basis while playing back the cutout source data file frame by frame. Once the cutout start location and end location are specified, the CPU 701 (the application program 714) moves the processing to S1402.

In S1402, the CPU 701 (the sequence information control program 713) loads the sequence information of the cutout origin data file selected in S1401 from the sequence info box (sqif) 404.

In S1403, the CPU 701 (the sequence information control program 713) generates, from the cutout start location and end location specified in S1401 and the sequence information generated in S1402, sequence information to be written into the data file generated through the cutout process. The sequence information generating process carried out in S1403 will be described in detail later with reference to FIG. 10B. The data file generated through the cutout process will be called a "cutout data file" hereinafter. In the case where the cutout origin data file contains a plurality of pieces of sequence information, the cutout data file may also have a plurality of pieces of sequence information.

In S1404, the CPU 701 (the application program 714) generates header information of the cutout data file, specifically information that the file type box (ftyp) 401 and the movie box (moov) 402 contain. This information also includes the sequence information generated in S1403. The CPU 701 (the control program 711) carries out a process for opening the file, and records the generated header information into the external storage device 702.

In S1405, the CPU 701 (the control program 711 and the application program 714) reads out one frame's worth of the moving image data and audio data in a cutout segment from the cutout origin data file and writes that data into the working memory area 717 of the RAM 705. The method for obtaining the moving image data and audio data from a data file in the ISO base media file or a compatible format is known, and thus detailed descriptions thereof will be omitted.

In S1406, the CPU 701 (the control program 711) writes the moving image data and audio data obtained in S1405 from the RAM 705 into the cutout data file that was opened in S1404.

To simplify the descriptions and facilitate understanding, it is assumed here that the format of the image data and audio data is not changed during the cutout process. However, re-encoding may be carried out as necessary, in the same manner as in the joining process.

In S1407, the CPU 701 (the application program 714) determines whether the frames have been processed up to the cutout end location specified in S1401. If it is determined that these frames have been processed, the CPU 701 (the control program 711) carries out a process for closing the file and then ends the cutout process. However, if it is not determined that the frames have been processed up to the cutout end location, the CPU 701 (the application program 714) moves the processing to S1405 in order to move to the next frame to be processed.

Next, the sequence information generating process carried out in S1403 will be described in detail with reference to the flowchart in FIG. 10B.

In S1421, the CPU 701 (the sequence information control program 713) stores the first sequence information, among the sequence information of the cutout origin data file obtained in S1402, as sequence information tmp. The sequence information imp is a variable. The CPU 701 (the sequence information control program 713) also sets a scanning position variable cur to a default value of 1.

In S1422, the CPU 701 (the sequence information control program 713) determines whether or not the cutout start location set in S1401 is within a segment of frames indicated by the sequence information tmp. This determination can be carried out on the basis of a magnitude relationship between a value 1 lower than a sum of a total frame number N in the segment of frames indicated by the sequence information tmp and the variable cur (N+cur−1), and a frame number S of the cutout start location.

Specifically, if the following holds true:

$$(N+\mathrm{cur}-1) \geq S$$

then the CPU 701 (the sequence information control program 713) determines that the cutout start location is within the segment of frames indicated by the sequence information tmp. Note that the total frame number N of the segment of frames indicated by the sequence information tmp can be found by adding 1 to the difference between the Frame Indexes (End Frame Index−Start Frame Index).

If the CPU 701 (the sequence information control program 713) determines that the cutout start location is within the segment of frames indicated by the sequence information tmp, the processing moves to S1424, whereas if the CPU 701 (the sequence information control program 713) does not determine that the cutout start location is within that segment of frames, the processing moves to S1423.

In S1423, the CPU 701 (the sequence information control program 713) updates the variables and returns the processing to S1422. Specifically, the CPU 701 (the sequence information control program 713) sets the variable cur to (cur+the total frame number N of the segment of frames indicated by the sequence information tmp). Additionally, the CPU 701 (the sequence information control program 713) sets the sequence information tmp to the next sequence information in the cutout origin data file.

In S1424, the CPU 701 (the sequence information control program 713) sets the sequence information A (the variable) to the sequence information tmp. Furthermore, the CPU 701 (the sequence information control program 713) sets the Start Frame Index of the sequence information A to the cutout start location in the segment indicated by the sequence information tmp. The value of the Start Frame Index is calculated as follows: Start Frame Index of sequence information tmp+frame number of cutout start location−cur.

In the case where the Start Frame Index of the sequence information A is a different value from the Start Frame Index of the original sequence information tmp, the CPU 701 (the sequence information control program 713) sets the sequence information to indicate that a time axis direction edit has been made. Specifically, the CPU 701 (the sequence information control program 713) sets the first bit of the Past Processing Status in the sequence information A to 1.

Next, in S1425, the CPU 701 (the sequence information control program 713) determines whether or not the sequence information tmp includes the cutout end location set in S1401. This determination can be carried out on the basis of a magnitude relationship between a value 1 lower than the sum of the total frame number N in the segment of frames indicated by the sequence information tmp and the variable cur (N+cur−1), and a frame number E of the cutout end location.

Specifically, if the following holds true:

$$(N+\mathrm{cur}-1) \geq E$$

then the CPU 701 (the sequence information control program 713) determines that the cutout end location is within the segment of frames indicated by the sequence information tmp.

If the CPU 701 (the sequence information control program 713) determines that the cutout end location is within the segment of frames indicated by the sequence information tmp, the processing moves to S1428, whereas if the CPU 701 (the sequence information control program 713) does not determine that the cutout end location is within that segment of frames, the processing moves to S1426.

In S1426, the CPU 701 (the sequence information control program 713) writes (adds) the sequence information A into the sequence info box (sqif) 404 of the cutout data file, after which the processing moves to S1427. In the case where the sequence information A and the sequence information tmp have different values for the End Start Index, the CPU 701 (the sequence information control program 713) sets the sequence information A to indicate that a time axis direction edit has been made. In other words, the CPU 701 (the sequence information control program 713) sets the first bit of the Past Processing Status in the sequence information A to 1.

In S1427, the CPU 701 (the sequence information control program 713) updates the variables and returns the processing to S1425. Specifically, the CPU 701 (the sequence information control program 713) sets the variable cur to (cur+the total frame number N of the segment of frames indicated by the sequence information tmp). Additionally, the CPU 701 (the sequence information control program 713) sets the sequence information tmp to the next sequence information in the cutout origin data file, and sets the sequence information A to the sequence information tmp.

In S1428, the CPU 701 (the sequence information control program 713) sets the End Frame Index of the sequence information A to the cutout end location of the segment of frames in the sequence information tmp. This cutout end location is obtained as follows: Start Frame Index of sequence information tmp+frame number of cutout end location−cur. In the case where the sequence information A and the sequence information tmp have different values for the End Start Index, the CPU 701 (the sequence information control program 713) sets the sequence information A to indicate that a time axis direction edit has been made. In other words, the CPU 701 (the sequence information control program 713) sets the first bit of the Past Processing Status in the sequence information A to 1.

The CPU 701 (the sequence information control program 713) writes (adds) the sequence information A into the sequence info box (sqif) 404 of the cutout data file, after which the processing ends.

A specific example of the sequence information written into the sequence info box (sqif) 404 of the cutout data file as a result of this cutout process will be described with reference to FIG. 11A.

In FIG. 11A, the sequence information 1003 of the cutout origin data file corresponds to the sequence information of the joined data file CON_MOV_0003 illustrated in FIG. 7B. Meanwhile, sequence information 1501 is sequence information of a cutout data file CUT_CON_MOV_0003 generated by carrying out the cutout process on the joined data file CON_MOV_0003.

It is assumed here that in S1401, the joined data file CON_MOV_0003, a cutout start location frame number of 51, and an end location frame number of 140 are specified in the cutout origin data file. In this case, the sequence information generating process is carried out as follows in S1403.

In S1421, the CPU 701 (the sequence information control program 713) sets the sequence information tmp to the first sequence information 1003a of the sequence information 1003, and sets the variable cur to 1.

In S1422, the CPU 701 (the sequence information control program 713) determines that the following relationship holds true, on the basis of the total frame number N of the segment of frames indicated by the sequence information tmp (100), cur (1), and the frame number S of the cutout start location (51):

$$(N+\text{cur}-1) \geq S$$

In other words, the CPU 701 (the sequence information control program 713) determines that the cutout start location is within the segment of frames indicated by the sequence information tmp, and moves the processing to S1424.

In S1424, the CPU 701 (the sequence information control program 713) sets the sequence information A to the sequence information tmp. Additionally, the CPU 701 (the sequence information control program 713) sets the Start Frame Index of the sequence information A to 51, on the basis of the following calculation: Start Frame Index of sequence information tmp (1)+cutout start location (51)−cur (1). Thus the value of the Start Frame Index of the sequence information A (51) will be different from the value of the Start Frame Index of the sequence information tmp (1). Thus the CPU 701 (the sequence information control program 713) furthermore sets the first bit of the Past Processing Status in the sequence information A to 1.

Next, in S1425, the CPU 701 (the sequence information control program 713) determines that the following relationship does not hold true, on the basis of the total frame number N of the segment of frames indicated by the sequence information tmp (100), the variable cur (1), and the frame number E of the cutout end location (140):

$$(N+\text{cur}-1) \geq E$$

In other words, the CPU 701 (the sequence information control program 713) determines that the cutout end location is not within the segment of frames indicated by the sequence information tmp, and moves the processing to S1426.

In S1426, the CPU 701 (the sequence information control program 713) adds the sequence information A (sequence information 1501a indicated in FIG. 11A) to the sequence information 1501 of the cutout data file. In the drawings, the 32-bit flag Past Processing Status is represented as a hexadecimal, and thus the first bit being set to "1" is expressed as "2", corresponding to the least significant four bits.

Next, in S1427, the CPU 701 (the sequence information control program 713) sets the variable cur to a value of 101, calculated as follows: cur (1)+total frame number N of segment of frames indicated by sequence information tmp (100). Additionally, the CPU 701 (the sequence information control program 713) sets the sequence information tmp to the next sequence information 1003b in the cutout origin data file, and furthermore sets the sequence information A to the sequence information tmp. The sequence information A is also set to the sequence information 1003b as a result.

The second time the process of S1425 is carried out, the CPU 701 (the sequence information control program 713) determines that the following relationship holds true, on the basis of the total frame number N of the segment of frames indicated by the sequence information tmp (50), the variable cur (101), and the frame number E of the cutout end location (140):

$$(N+\text{cur}-1) \geq E$$

In other words, the CPU 701 (the sequence information control program 713) determines that the cutout end location is within the segment of frames indicated by the sequence information tmp, and moves the processing to S1428.

In S1428, the CPU 701 (the sequence information control program 713) sets the End Frame Index of the sequence information A to 40, on the basis of the following calculation: Start Frame Index of the sequence information tmp (1)+frame number of cutout end location (140)−cut (101). Here, the End Frame Index of the sequence information A (40) is a different value from the End Frame Index of the sequence information tmp (50). Accordingly, the CPU 701 (the sequence information control program 713) sets the first bit of the Past Processing Status in the sequence information A to 1. Furthermore, the CPU 701 (the sequence information control program 713) writes (adds) the sequence information A into the sequence info box (sqif) 404 of the cutout data file, after which the processing ends.

The sequence information 1501 for the cutout data file including the sequence information added in S1426 and S1428 is generated in this manner. FIG. 11B schematically illustrates changes in the Start Frame Index and the End Frame Index of the sequence information tmp and the sequence information A, as well as the variable cur, occurring during the above-described processing.

<Management Process (Cutout Data File)>

Next, an example of a display carried out when handling a cutout data file in the management display operations described above in terms of a joined data file will be described with reference to FIG. 12, to illustrate the utility of the data file structure according to the present embodiment.

FIG. 12 is a diagram illustrating an example of the information displayed by the CPU 701 (the application program 714) in S1108 in the case where the cutout data file CUT_CON_MOV_0003 has been selected in S1101. In this case, a cutout origin data file CON_MOV_0003 and the data files MOV_0003 and MOV_0004 are determined to be displayed as a result of the processing loop from S1103 to S1106. Accordingly, the filenames and sequence information of the cutout origin data file CON_MOV_0003 and the data files MOV_0003 and MOV_0004 are added to the display information list.

From the display illustrated in FIG. 12, it can be understood at a glance that the cutout data file CUT_CON_MOV_0003 has been generated by applying the cutout process to the cutout origin data file CON_MOV_0003. At the same time, it can be understood at a glance that the cutout data file CUT_CON_MOV_0003 corresponds to a data file obtained by joining parts of the data files MOV_0003 and MOV_0004. The user can also understand at a glance the relationship between the moving image data segments that the pre- and post-editing data files store, on a frame-by-frame basis.

Although FIG. 12 illustrates a case where a cutout data file has been selected, the same display is made regardless of whether a cutout origin joined data file or a pre-joining data file has been selected. The information of the selected data file may be displayed first or last, or the cutout data file, the original data file, or the like may be displayed first or last. In either case, the information of the selected data file can be displayed so as to be visually different (that is, having a different color, size, or the like) from the information of other data files.

A data file obtained from the same instance of shooting as the selected data file (that is, a data file having the same Shooting ID value) is described as being the data file to be displayed with reference to FIGS. 8 to 9B and 12. However, there is no particular limit on the conditions for the data file to be displayed. For example, a plurality of conditions may be combined, such as displaying only data files obtained from the same instance of shooting as the selected data file and in which the segments that are stored overlap. Additionally, in S1101, specific conditions may be specified instead of selecting the data file. For example, conditions such as a data file storing data that has been re-encoded, a data file storing greater than or equal to a predetermined number of frames, a data file having a specific Shooting ID, or an original data file may be specified. The screen displayed by the CPU 701 (the application program 714) in S1101 may be changed in accordance with conditions that can be specified by the user, and the determination of S1106 may then be carried out in accordance with the specified conditions.

According to the present embodiment as described thus far, a data file storing moving image data includes shooting identification information of the moving image data stored in the data file and information specifying a segment of frames stored in the moving image data. This data structure makes it possible to easily specify data files storing moving image data obtained from the same instance of shooting. Additionally, it is easy to know a relationship between segments of moving image data stored in a plurality of data files obtained from the same instance of shooting, on a frame-by-frame basis.

Furthermore, including information of the total frame number of moving image data obtained from the same instance of shooting in the data files makes it possible to know which segments of the original moving image data are stored in the data file without referring to other data files. Additionally, including information indicating whether or not an edit has been made to the moving image data in the data file makes it possible to easily specify a data file that stores original (unprocessed) moving image data obtained from the shooting. Additionally, including information related to edits that have been applied, such as the type and number of edits, in the data file makes it possible to easily specify a data file storing moving image data to which a specific edit has been applied.

By arranging the above-described information related to the moving image data that is contained (that is, the associated information) in a specific location within the data file, the associated information can be obtained with ease. In particular, arranging the associated information before the moving image data makes it even easier to obtain the associated information.

Using a data file having such a data structure not only makes it possible to easily manage data files using an information processing apparatus that handles such data files, but also makes it possible to easily provide useful management information to a user.

For example, providing the associated information of data files obtained from the same instance of shooting in a comparable manner makes it possible for the user to easily specify unnecessary data files, data files to be joined, segments of frames to be cut out from original moving image data, and so on, for example.

Other Embodiments

In the above-described embodiment, a plurality of frames within a sequence are managed on the basis of the frame start location and the frame end location in the sequence information. However, the frame end location can be calculated by adding the frame start location to the frame number, and thus the configuration may be such that the frame end location is replaced with the frame number.

The above embodiment describes a configuration in which a specific data structure is used during recording, but the structure of a data file that has already been recorded may be replaced with the above-described structure. For example, when importing a data file into the PC 700, the moving image data (and audio data) can be decoded in the same manner as when re-encoding, and then converted into a data file having the data structure illustrated in FIG. 3A. An information processing apparatus that carries out such data format conversion also falls within the scope of the present invention.

The above embodiment describes an example in which shooting identification information is used as the associated information for determining whether or not a moving image data has been obtained from the same instance of shooting. However, the shooting identification information can be used more generically as information for identifying a data file that stores related moving image data. Accordingly, it is not absolutely necessary to use a unique value in a shooting sequence. For example, in the case where moving image data is generated by editing a given piece of moving image data, the shooting identification information of the data file storing the original moving image data can be set to any desired value. This makes it possible to easily manage the data file storing the original moving image data and the data file storing the moving image data generated through the editing.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-074600, filed on Apr. 1, 2016, which is hereby incorporated by reference herein in its entirety.

The invention claimed is:

1. An information processing apparatus comprising:
an obtainment unit that obtains moving image data; and
a generating unit that generates a data file for moving image data,
wherein the generating unit generates a data file having data structure comprising:
an area for the moving image data, and an area, different from the area for the moving image data, for associated information related to the moving image data,
wherein the associated information includes identification information for identifying a related data file that contains related moving image data being related to the moving image data, and information specifying frame numbers of a starting frame and an ending frame of the moving image data stored in the generated data file,
wherein in a case where the moving image data obtained by the obtainment unit is from a single instance of shooting, and is to be stored over a first data file and a second data file, the generating unit allows frames of the moving image data from the single instance of shooting to have sequential numbers from the first data file to the second data file by including a frame number of a starting frame of the moving image data from the single instance of shooting stored in the second data file that is a subsequent frame number relative to a frame number of an ending frame of the moving image data from the single instance of shooting stored in the first data file.

2. The information processing apparatus according to claim 1,
wherein the identification information is information assigned for each instance of shooting.

3. The information processing apparatus according to claim 1,
wherein the associated information further includes information of a total frame number of the moving image data.

4. The information processing apparatus according to claim 1,
wherein the associated information further includes information related to an edit of the moving image data.

5. The information processing apparatus according to claim 4,
wherein the information related to the edit includes information indicating whether or not an edit has been made to the moving image data.

6. The information processing apparatus according to claim 4,
wherein the information related to the edit includes information indicating the type of edit has been made to the moving image data.

7. The information processing apparatus according to claim 1,
wherein the area for the associated information is arranged before the area for the moving image data.

8. The information processing apparatus according to claim 1,
wherein an offset value of a starting location of the area for the associated information, from the start of the data file, is a fixed value.

9. The information processing apparatus according to claim 1,
wherein the data structure is based on a container structure according to the ISO base media file format or a format compatible therewith.

10. The information processing apparatus according to claim 9,
wherein the area for the moving image data is included in a media data box (mdat) and the area for the associated information is included in a movie box (moov).

11. The information processing apparatus according to claim 10,
wherein the area for the associated information is included in an extension box (uuid).

12. The information processing apparatus according to claim 11,
wherein the extension box (uuid) is arranged at the start of the movie box (moov) and the area for the associated information is arranged at the start of the extension box (uuid).

13. The information processing apparatus according to claim 1,
wherein the moving image data is moving image data obtained through shooting; and
the generating unit generates the data file using unique information of each instance of shooting as the identification information.

14. The information processing apparatus according to claim 1,
wherein in the case where the moving image data is stored over a plurality of data files, the generating unit records the same identification information in each of the plurality of data files.

15. The information processing apparatus according to claim 1,
wherein in the case where the moving image data is stored over a plurality of data files, the generating unit records information indicating that the moving image data has been recorded in a divided state as the associated information in each of the plurality of data files.

16. The information processing apparatus according to claim 1, wherein in the case where the moving image data from the single instance of shooting is stored over the first and second data files, the associated information stored for each of the first and second data files includes a total frame number corresponding to the total number of frames of the moving image data from the single instance of shooting, and wherein the total frame number is equal to the starting frame of the moving image data from the single instance of shooting stored in the second data file plus the total number of frames in the second data file.

17. A control method for an information processing apparatus, the method comprising:
obtaining moving image data; and
generating a data file for storing moving image data,
wherein the step of generating generates a data file having the data structure comprising:
an area for the moving image data, and an area, different from the area for the moving image data, for associated information related to the moving image data, wherein the associated information includes identification information for identifying a related data file that contains a related moving image data being related to the moving image data, and information specifying frame numbers of a starting frame and an ending frame of the moving image data stored in the generated data file, and wherein in a case where the moving image data obtained is from a single instance of shooting, and is to be stored over a first data file and a second data file, the generating allows frames of the moving image data from the single instance of shooting to have sequential numbers from the first data file to the and second data file by including a frame number of a starting frame of the moving image data from the single instance of shooting stored in the second data file that is a subsequent frame number relative to a frame number of an ending frame of the moving image data from the single instance of shooting stored in the first data file.

18. A non-transitory computer-readable medium storing a program that causes a computer to function as an information processing apparatus comprising:

an obtainment unit that obtains moving image data; and
a generating unit that generates a data file for moving image data, wherein the generating unit generates a data file having data structure comprising:

an area for the moving image data, and an area, different from the area for the moving image data, for associated information related to the moving image data, wherein the associated information includes identification information for identifying a related data file that contains a related moving image data being related to the moving image data, and information specifying frame numbers of a starting frame and an ending frame of the moving image data stored in the generated data file, wherein in a case where the moving image data obtained by the obtainment unit is from a single instance of shooting, and is to be stored over a first data file and a second data file, the generating unit allows frames of the moving image data from the single instance of shooting to have sequential numbers from the first data file to the second data file by including a frame number of a starting frame of the moving image data from the single instance of shooting stored in the second data file that is a subsequent frame number relative to a frame number of an ending frame of the moving image data from the single instance of shooting stored in the first data file.

* * * * *